United States Patent
Inagaki et al.

(10) Patent No.: US 8,663,850 B2
(45) Date of Patent: *Mar. 4, 2014

(54) NONAQUEOUS ELECTROLYTE BATTERY, BATTERY PACK AND VEHICLE

(75) Inventors: Hiroki Inagaki, Kawasaki (JP);
Hidesato Saruwatari, Saku (JP); Yumi Fujita, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 949 days.

This patent is subject to a terminal disclaimer.

(21) Appl. No.: 11/940,688

(22) Filed: Nov. 15, 2007

(65) Prior Publication Data
US 2008/0176142 A1 Jul. 24, 2008

Related U.S. Application Data

(63) Continuation of application No. PCT/JP2007/064832, filed on Jul. 24, 2007.

(30) Foreign Application Priority Data

Aug. 4, 2006 (JP) .................................. 2006-213577

(51) Int. Cl.
*H01M 4/48* (2010.01)
*H01M 4/58* (2010.01)
*H01M 10/40* (2006.01)

(52) U.S. Cl.
USPC ... 429/330; 429/209; 429/231.8; 429/231.95; 429/331

(58) Field of Classification Search
USPC ............................................. 429/330, 231.95
See application file for complete search history.

(56) References Cited

U.S. PATENT DOCUMENTS 5,888,670 A * 3/1999 Kawakami ................. 429/231.4
6,994,936 B2 2/2006 Mori (Continued)

FOREIGN PATENT DOCUMENTS

| CN | 1435906 A | 8/2003 |
| CN | 1728442 A | 2/2006 |

(Continued)

OTHER PUBLICATIONS

U.S. Appl. No. 12/512,540, filed Jul. 30, 2009, Inagaki, et al.

(Continued)

*Primary Examiner* — Barbara Gilliam
*Assistant Examiner* — Steven Scully
(74) *Attorney, Agent, or Firm* — Oblon, Spivak, McClelland, Maier & Neustadt, L.L.P.

(57) ABSTRACT

A nonaqueous electrolyte battery includes a negative electrode and a nonaqueous electrolyte. The negative electrode comprises an active material having a lithium ion insertion potential of 0.4V (vs $Li/Li^+$) or more, a conductive agent and a current collector. The nonaqueous electrolyte contains first sultones having an unsaturated hydrocarbon group. A diameter distribution of pores of the negative electrode when measured by mercury porosimetry has a first peak having a mode diameter of 0.01 to 0.2 μm and a second peak having a mode diameter of 0.003 to 0.02 μm. A volume of pores having a diameter of 0.01 to 0.2 μm and a volume of pores having a diameter of 0.003 to 0.02 μm, which are measured by the mercury porosimetery, are 0.05 to 0.5 mL and 0.0001 to 0.02 mL, respectively, per g of the negative electrode excluding the current collector.

25 Claims, 12 Drawing Sheets

(56) References Cited

U.S. PATENT DOCUMENTS

| | | |
|---|---|---|
| 2003/0151868 A1* | 8/2003 | Inae et al. ............... 361/88 |
| 2003/0170549 A1* | 9/2003 | Murai ................... 429/329 |
| 2005/0064282 A1 | 3/2005 | Inagaki et al. |
| 2005/0069777 A1 | 3/2005 | Takami et al. |
| 2005/0221173 A1 | 10/2005 | Tatebayashi et al. |
| 2005/0221187 A1* | 10/2005 | Inagaki et al. ......... 429/231.95 |
| 2005/0221188 A1 | 10/2005 | Takami et al. |
| 2006/0046155 A1 | 3/2006 | Inagaki et al. |
| 2006/0068272 A1 | 3/2006 | Takami et al. |
| 2006/0134520 A1 | 6/2006 | Ishii et al. |
| 2006/0216600 A1 | 9/2006 | Inagaki et al. |
| 2006/0257746 A1 | 11/2006 | Inagaki et al. |
| 2007/0009794 A1 | 1/2007 | Takami et al. |
| 2007/0009797 A1 | 1/2007 | Takami et al. |
| 2007/0009798 A1 | 1/2007 | Inagaki et al. |
| 2007/0009801 A1* | 1/2007 | Inagaki et al. ......... 429/231.95 |
| 2007/0059592 A1 | 3/2007 | Takami et al. |
| 2007/0059602 A1 | 3/2007 | Morishima et al. |
| 2007/0072080 A1 | 3/2007 | Inagaki et al. |
| 2007/0231690 A1 | 10/2007 | Fujita et al. |
| 2007/0231693 A1 | 10/2007 | Inagaki et al. |
| 2007/0231702 A1 | 10/2007 | Fujita et al. |
| 2008/0070115 A1 | 3/2008 | Saruwatari et al. |

FOREIGN PATENT DOCUMENTS

| | | |
|---|---|---|
| JP | 11-162511 | 6/1999 |
| JP | 2002-329528 | 11/2002 |
| JP | 2003-163029 | 6/2003 |
| JP | 2003-257479 | 9/2003 |
| JP | 2004-158213 | 6/2004 |
| JP | 2004-172113 | 6/2004 |
| JP | 2004-172114 | 6/2004 |
| JP | 2005-72008 | 3/2005 |
| JP | 2005-317508 | 11/2005 |
| JP | 2006-294519 | 10/2006 |
| JP | 2007-5293 | 1/2007 |
| KR | 2001-0082428 | 8/2001 |
| KR | 10-2004-0006994 | 1/2004 |
| KR | 2005-30566 | 3/2005 |
| KR | 10-1073764 | 10/2011 |
| WO | WO 2007/043624 A1 | 4/2007 |

OTHER PUBLICATIONS

U.S. Appl. No. 13/560,375, filed Jul. 27, 2012, Kishi, et al.
Notification for Filing Opinion issued Jul. 30, 2012 in Korean Patent Application No. 10-2011-7015330 (with English translation).
U.S. Appl. No. 13/181,211, filed Jul. 12, 2011, Inagaki, et al.
U.S. Appl. No. 13/208,731, filed Aug. 12, 2011, Kishi, et al.
Office Action issued Sep. 1, 2010, in Korean Patent Application No. 10-2008-7021653 (with English-language Translation).

* cited by examiner

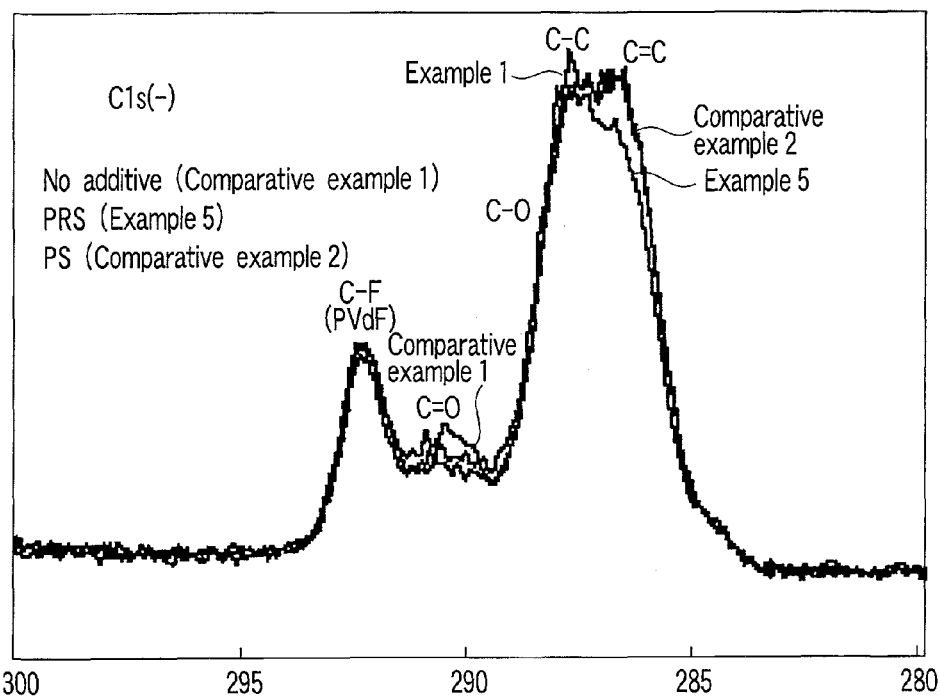
F I G. 17
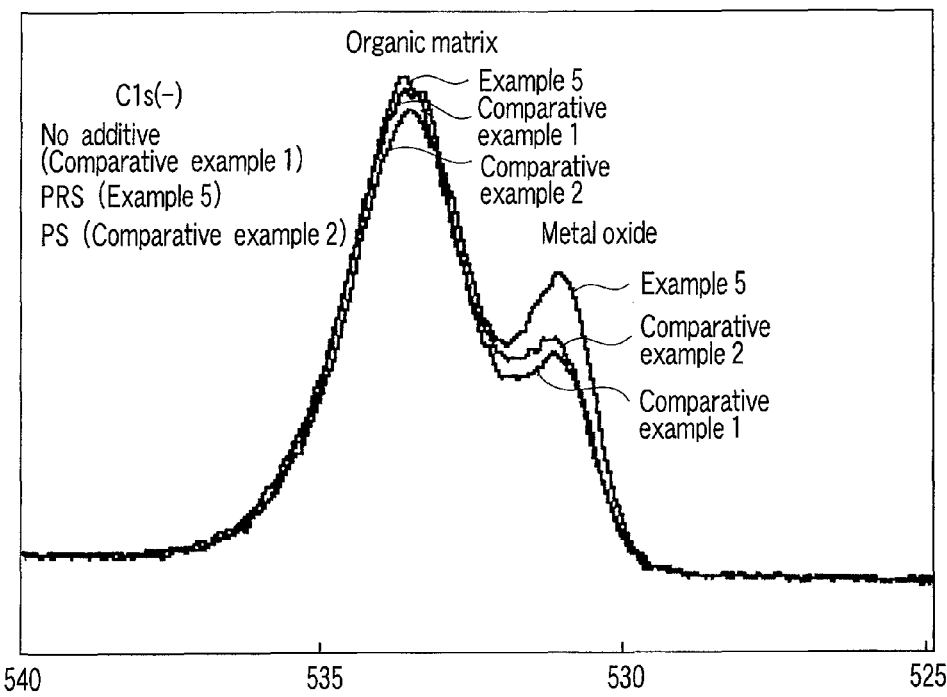
F I G. 18

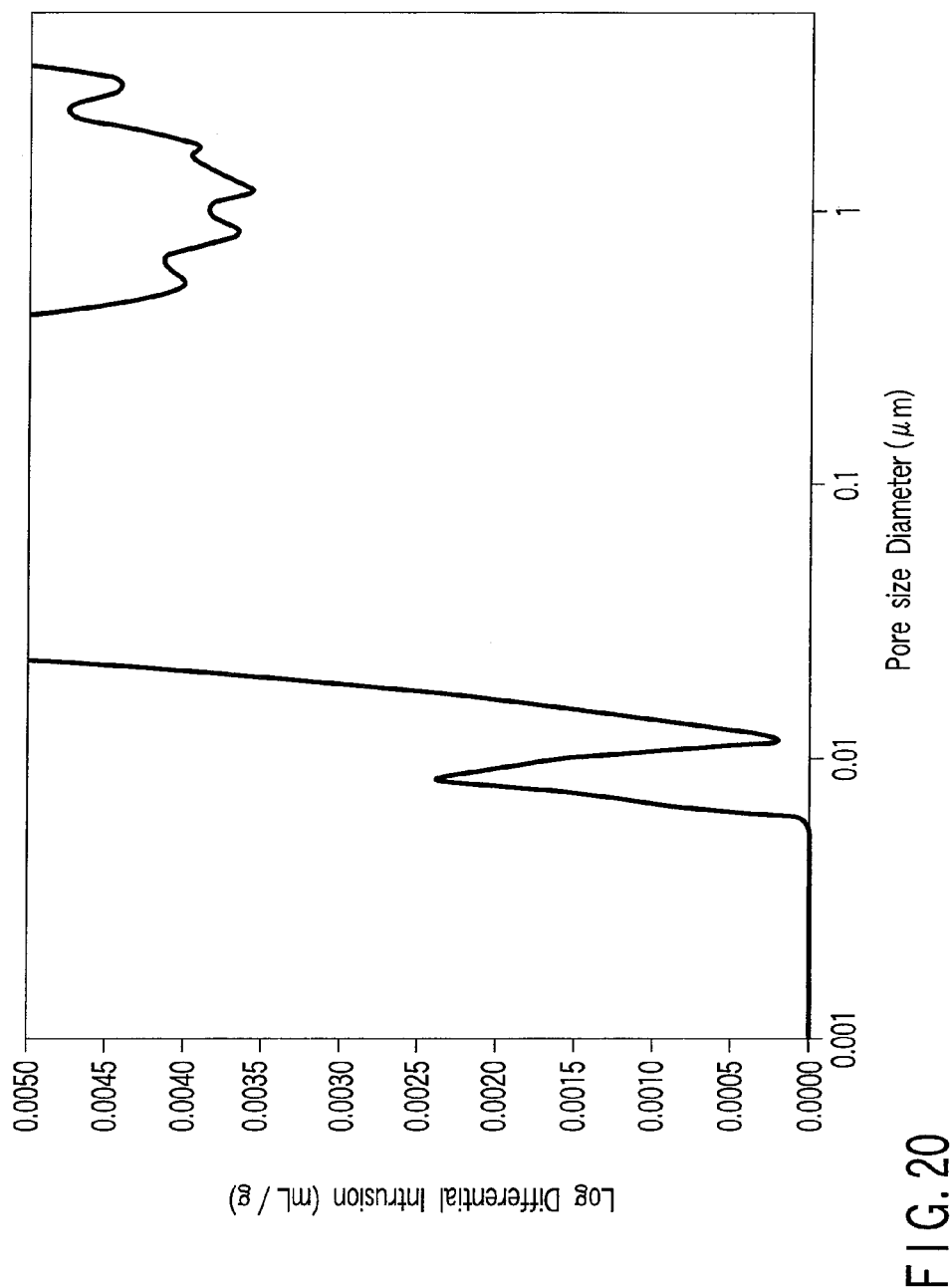
F I G. 20

NONAQUEOUS ELECTROLYTE BATTERY, BATTERY PACK AND VEHICLE

CROSS REFERENCE TO RELATED APPLICATIONS

This is a Continuation Application of PCT Application No. PCT/JP2007/064832, filed Jul. 24, 2007, which was published under PCT Article 21(2) in Japanese.

This application is based upon and claims the benefit of priority from prior Japanese Patent Application No. 2006-213577, filed Aug. 4, 2006, the entire contents of which are incorporated herein by reference.

BACKGROUND OF THE INVENTION

1. Field of the Invention

The present invention relates to a nonaqueous electrolyte battery, a battery pack and a vehicle.

2. Description of the Related Art

Nonaqueous electrolyte batteries, in which lithium ions are transferred between a negative electrode and a positive electrode to charge and discharge, have been enthusiastically researched and developed as high-energy density batteries.

Nonaqueous electrolyte batteries using a lithium-transition metal oxide as a positive electrode active material and a carbonaceous material as a negative electrode active material have been already commercialized. Generally, Co, Mn, Ni or the like is used as the transition metal component of the lithium-transition metal oxide.

A nonaqueous electrolyte battery using a lithium-titanium oxide as the negative electrode active material has been recently put to practical use. The lithium-titanium oxide has a lithium ion insertion potential of about 1.55V vs Li/Li$^+$, which is higher than that of a carbonaceous material. The lithium-titanium oxide is small in the change of volume accompanying the charge-discharge operation of the battery, the lithium-titanium oxide is expected to impart excellent charge-discharge cycle performance. Also, lithium ions are inserted in and released from the lithium-titanium oxide by a reaction that no lithium metal is precipitated on the negative electrode and therefore, it enables charge under a large current. Specifically, a rapid charge can be performed.

Note that this lithium-titanium oxide has low conductivity and it is therefore preferable to blend a conductive agent to enable charge and discharge under a large current. In JP-A 2003-163029 (KOKAI), the conductive agent is added to a negative electrode using lithium titanate as an active material, and ethylene sulfite and propane sultone are added to an electrolysis solution, thereby improving the negative electrode.

If a battery using a carbonaceous material as a conductive agent is stored under a high-temperature circumstance, this causes significant generation of gas. This is because a stable film is not formed on the carbonaceous material, which is a conductive agent, at a working potential of a negative electrode using lithium titanate as an active material, and the electrolysis solution is always decomposed and consumed on the surface of the carbonaceous material which is in contact with the electrolysis solution.

In JP-A 2005-317508 (KOKAI), on the other hand, a chain sulfite such as diethyl sulfite or dimethyl sulfite is added to the electrolysis solution to form a film on a surface of the negative electrode, thereby preventing gas from being generated from the negative electrode. However, such a film hinders the transfer of lithium ions or electrons on the surface of lithium titanate, giving rise to the problem that the large-current performance (high-rate load characteristics) of a battery is deteriorated.

Note that JP-A 2005-72008 (KOKAI) discloses that a negative electrode active material consisting of vanadium oxide represented by $Li_xM_yV_zO_{2+d}$ has a pore volume having a diameter of 0.1 to 10 μm in a ratio of $10^{-3}$ cc/g to 0.8 cc/g per particle weight.

BRIEF SUMMARY OF THE INVENTION

According to a first aspect of the present invention, there is provided a nonaqueous electrolyte battery comprising:

a positive electrode;

a negative electrode comprising an active material having a lithium ion insertion potential of 0.4V (vs Li/Li$^+$) or more, a conductive agent containing a carbonaceous material, and a current collector supporting the active material and the conductive agent; and a nonaqueous electrolyte containing first sultones having an unsaturated hydrocarbon group, wherein a diameter distribution of pores of the negative electrode when measured by mercury porosimetry has a first peak having a mode diameter of 0.01 to 0.2 μm and a second peak having a mode diameter of 0.003 to 0.02 μm, and a volume of pores having a diameter of 0.01 to 0.2 μm and a volume of pores having a diameter of 0.003 to 0.02 μm, which are measured by the mercury porosimetery, are 0.05 to 0.5 mL and 0.0001 to 0.02 mL, respectively, per g of the negative electrode excluding the current collector.

According to a second aspect of the present invention, there is provided a battery pack comprising a nonaqueous electrolyte battery, the nonaqueous electrolyte battery comprising:

a positive electrode;

a negative electrode comprising an active material having a lithium ion insertion potential of 0.4V (vs Li/Li$^+$) or more, a conductive agent containing a carbonaceous material, and a current collector supporting the active material and the conductive agent; and a nonaqueous electrolyte containing first sultones having an unsaturated hydrocarbon group, wherein a diameter distribution of pores of the negative electrode when measured by mercury porosimetry has a first peak having a mode diameter of 0.01 to 0.2 μm and a second peak having a mode diameter of 0.003 to 0.02 μm, and a volume of pores having a diameter of 0.01 to 0.2 μm and a volume of pores having a diameter of 0.003 to 0.02 μm, which are measured by the mercury porosimetery, are 0.05 to 0.5 mL and 0.0001 to 0.02 mL, respectively, per g of the negative electrode excluding the current collector.

BRIEF DESCRIPTION OF THE SEVERAL VIEWS OF THE DRAWING

FIG. 17 is a characteristic view showing the XPS profile (C=C component) of the surface of a negative electrode in each of Example 5 and Comparative Examples 1 and 2.

FIG. 18 is a characteristic view showing the XPS profile (metal component) of the surface of a negative electrode in each of Example 5 and Comparative Examples 1 and 2.

FIG. 20 is a characteristic view obtained by enlarging the distribution of pore diameters in the vicinity of 0.01 μm among the distribution of pore diameters of FIG. 19.

DETAILED DESCRIPTION OF THE INVENTION

Figure 1:
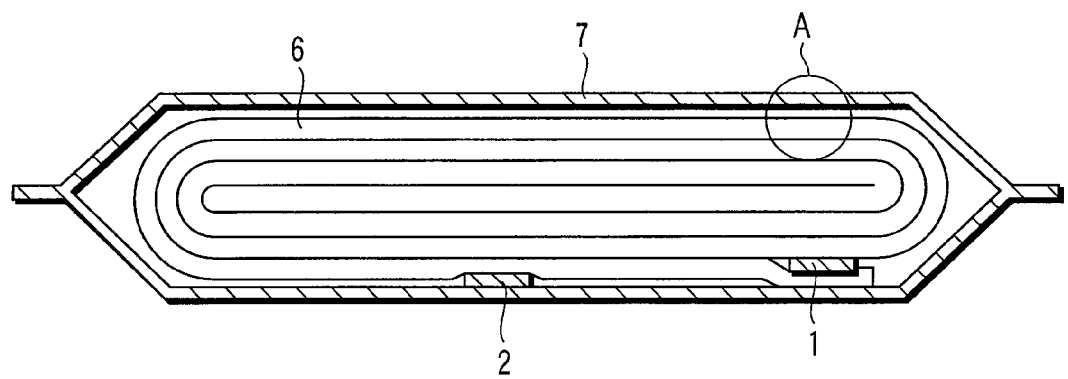
FIG. 1 a sectional view of a flat type nonaqueous electrolyte battery according to a first embodiment.

The present invention is based on the following findings. In a porous negative electrode including an active material having a lithium ion insertion potential of 0.4V or more and a conductive agent containing a carbonaceous material, the generation of gas when a battery is stored at a high temperature is suppressed if first sultones having an unsaturated hydrocarbon group are used when the distribution of pore diameters of the negative electrode measured by mercury porosimetry fulfills the following requirements (A) and (B), whereby a nonaqueous electrolyte battery excellent in large current performance and cycle performance can be attained.

(A) In the distribution of pore diameters, there are a first peak having a mode diameter of 0.01 μm or more and 0.2 μm or less and a second peak having a mode diameter of 0.003 μm or more and 0.02 μm or less.

(B) The volume of pores having a diameter of 0.01 μm or more and 0.2 μm or less, which is measured by mercury porosimetry, is 0.05 mL or more and 0.5 mL or less per g of the negative electrode excluding a current collector. Also, the volume of pores having a diameter of 0.003 μm or more and 0.02 μm or less, which is measured by mercury porosimetry, is 0.0001 mL or more and 0.02 mL or less per g of the negative electrode excluding the current collector.

Specifically, it has been found that when sultones having an unsaturated hydrocarbon group as an additive to a nonaqueous electrolyte are used in a nonaqueous electrolyte battery using a negative electrode containing an active material having a lithium ion insertion potential of 0.4V (vs Li/Li$^+$) or more, a thick film suppressing the decomposition of the nonaqueous electrolyte is formed on a carbonaceous material which is a conductive agent, and a thin, stable and low-resistance film is formed on the surface of the active material. Namely, it has been found that each film formation reaction of the conductive agent and active material selectively occurs, that is, the reactions forming the films having properties different from each other occur without affecting each other, to successfully suppress the generation of gas while the battery is stored at high temperatures.

Also, the inventors of the present invention have succeeded in making lower the resistance of the film to be formed on the active material by making macropores and mesopores exist in the negative electrode while fulfilling the requirements shown in the foregoing (A) and (B), thereby attaining a nonaqueous electrolyte battery limited in the generation of gas when stored at high temperatures without impairing large-current performance and cycle performance. This is because, in the case of allowing macropores and mesopores to exist in the negative electrode provided that the requirements shown in the above (A) and (B) are fulfilled, it is possible to greatly promote the impregnation of the negative electrode with the nonaqueous electrolyte caused by a capillary phenomenon, while forming films having properties different from each other on the active material and the conductive agent by selective reaction. If there is used an active material, such as graphite, a lithium metal or vanadium oxide represented by $Li_xM_yV_zO_{2+d}$ as described in the aforementioned JP-A 2005-72008 (KOKAI), which absorbs lithium ions at a potential less than 0.4V (vs. Li/Li$^+$), a film having the same level of thickness as in the case of using a carbonaceous material is formed. Therefore, even if macropores and mesopores are made to exist in the negative electrode provided that the requirements shown in the above (A) and (B) are fulfilled, the battery is deteriorated in large-current performance and cycle performance.

The reason why the distribution of diameters of pores of the negative electrode when measured by mercury porosimetry is defined within the above range will be explained in detail.

<First Peak>

Pores reflected on the first peak mostly belong to those formed among negative electrode structural elements such as active material particles, conductive agent and binder.

If the mode diameter of the first peak in the distribution of pore diameters of the negative electrode measured by mercury porosimetry is set to 0.2 μm or less, the impregnation with the nonaqueous electrolyte by a capillary phenomenon can be promoted. At the same time, the reason why the mode diameter is designed to be 0.01 μm or more is as follows. A film produced by the reaction with the nonaqueous electrolyte is formed on the surface of the active material and on the surface of the conductive agent. If the mode diameter of the first peak is designed to be less than 0.01 μm, the pores are clogged by the formation of the film, which reduces the liquid-retaining ability (nonaqueous electrolyte-retaining ability) of the negative electrode and also deteriorates the large-current performance of the battery. When the mode diameter of the first peak is made to be in the range of 0.01 μm to 0.2 μm, the impregnation with the nonaqueous electrolyte due to the capillary phenomenon can be promoted, and also, the clogging of pores caused by the formation of a film can be avoided. The mode diameter of the first peak is more preferably in the range of 0.02 to 0.1 μm.

The volume of pores having a diameter of 0.01 to 0.2 μm, which is measured by mercury porosimetry, is 0.05 to 0.5 mL per g of the negative electrode (excluding the current collector). First, the reason why the weight of the current collector is excluded will be explained. As will be described later, a conductive substrate such as an aluminum foil is used for the current collector. Therefore, when the weight of the current collector is subtracted from the weight of the negative electrode, the weight unrelated to the diameter distribution can be excluded. When the specific volume of pores is designed to be less than 0.05 mL/g, the nonaqueous electrolyte is depleted within the negative electrode, leading to deterioration in cycle performance and large-current performance. Also, when the specific volume of pores exceeds 0.5 mL/g, the distribution of the nonaqueous electrolyte is inclined toward the negative electrode, bringing about depletion of the nonaqueous electrolyte at the positive electrode. The specific volume of pores is more preferably 0.1 to 0.3 mL/g.

The surface area of pores having a diameter of 0.01 to 0.2 μm, which is measured by mercury porosimetry, is preferably 5 to 50 $m^2$ per g of the negative electrode (excluding the current collector). This is attributed to the reason explained below. The reason why the weight of the current collector is excluded is as mentioned above. Also, when the specific surface area of pores is designed to be less than 5 $m^2$/g, it is difficult to reduce the film resistance of the negative electrode. Also, the effect of promoting impregnation with the nonaqueous electrolyte is reduced and further it is difficult to form an ion-conducting film suppressing the generation of gas. When the specific surface area of pores exceeds 50 $m^2$/g, it is difficult to increase the electrode density and there is therefore a fear as to reduction in energy density. Also, there is a fear as to deterioration in output performance due to inferior electronic conductivity. The specific surface area of pores is more preferably in the range of 7 to 30 $m^2$/g.

The negative electrode preferably has mesopores reflected on the following second peak in addition to the macropores reflected on the above first peak. The pores reflected on the second peak will be explained below.

<Second Peak>

Pores reflected on the second peak almost belong to those which the active material itself has.

In the negative electrode having the second peak having a mode diameter ranging from 0.003 to 0.02 μm in the distribution of diameter when measured by mercury porosity, the ability of impregnation with the nonaqueous electrolyte is outstandingly improved, making it possible to attain an excellent large-current performance and cycle performance. This is because the presence of pores of the second peak promotes the capillary phenomenon, which enables the film on the surface of the active material to have a lower resistance. However, if the mode diameter of the second peak is designed to be less than 0.003 μm, this deteriorates the diffusibility of an electrolyte having a large molecular weight and there is therefore a fear as to deteriorated impregnating ability. Therefore, the lower limit of the mode diameter is preferably 0.003 μm and more preferably 0.005 to 0.015 μm.

The volume of pores having a diameter of 0.003 to 0.02 μm, which is measured by mercury porosimetry, is 0.0001 to 0.02 mL per g of the negative electrode (excluding the current collector). The reason why the weight of the current collector is excluded is as mentioned above. When the specific volume of pores is designed to be less than 0.0001 mL/g, the effect of improving the impregnation with the nonaqueous electrolyte is not obtained. Also, when the specific volume of pores exceeds 0.02 mL/g, the strength of the active material is reduced and particles are easily pulverized by a press for manufacturing the negative electrode. As a result, the cycle performance and high-rate performance are deteriorated. The specific volume of pores is more preferably 0.0005 to 0.01 mL/g.

The surface area of pores of the negative electrode having a diameter of 0.003 to 0.02 μm, which is measured by mercury porosimetry, is preferably 0.1 to 10 $m^2$ per g of the negative electrode (excluding the current collector). This is attributed to the reason explained below. The reason why the weight of the current collector is excluded is as mentioned above. Also, when the specific surface area of pores is designed to be less than 0.1 $m^2$/g, it is difficult to reduce the film resistance of the negative electrode. Also, it is difficult to obtain the effect of improving impregnation with the nonaqueous electrolyte and the effect of suppressing self-discharge is reduced. When the specific surface area of pores exceeds 10 $m^2$/g, it is difficult to increase the electrode density and therefore, energy density is reduced. The specific surface area of pores is more preferably in the range of 0.2 to 2 $m^2$/g.

The volume of pores of the negative electrode when measured by mercury porosimetry is preferably 0.1 to 1 mL per g of the negative electrode (excluding the current collector). The reason why the weight of the current collector is excluded is as mentioned above. When the specific volume of pores is designed to be 0.1 mL/g or more, the nonaqueous electrolyte can be sufficiently retained by the negative electrode. When the specific volume of pores is designed to be less than 0.1 mL/g, the nonaqueous electrolyte is depleted within the negative electrode, and there is a fear as to deterioration in cycle performance or large-current performance. Also, the reason why the specific volume of pores of the negative electrode is designed to be 1 mL/g or less is that if the volume of pores is too large, the distribution of the nonaqueous electrolyte is inclined toward the negative electrode, bringing about depletion of the nonaqueous electrolyte at the positive electrode. Therefore, the upper limit of the specific volume of pores is preferably designed to be 1.0 mL/g. The specific volume of pores is more preferably in the range of 0.2 to 0.5 mL/g.

The surface area of pores of the negative electrode, which is measured by mercury porosimetry, is preferably 5 to 50 $m^2$ per g of the negative electrode (excluding the current collector). This is attributed to the reason explained below. The reason why the weight of the current collector is excluded is as mentioned above. When the specific surface area of pores is designed to be less than 5 $m^2$/g, there is a fear that the above effect of improving impregnating ability based on the distribution of diameter cannot be fully obtained because the affinity of the negative electrode to the nonaqueous electrolyte is reduced. When the specific surface area of pores exceeds 50 $m^2$/g, the distribution of the nonaqueous electrolyte is inclined toward the negative electrode, bringing about a shortage of the nonaqueous electrolyte at the positive electrode and therefore, an improvement in charge-discharge cycle performance cannot be attained. The specific surface area of pores is more preferably in the range of 7 to 30 $m^2$/g.

Embodiments of the present invention will be explained below with reference to the drawings. The structures common to these embodiments are designated by the same symbols and duplicated explanations thereof will be omitted. Also, each figure is a typical one used to explain the invention and to promote the understanding thereof. There are parts where the shape, dimension and ratio of apparatuses shown in each figure are different from those of actual apparatuses. However, each design of these parts may be appropriately modified in consideration of the following explanations and known technologies.

First Embodiment

With regard to one example of a nonaqueous electrolyte battery according to a first embodiment, its structure will be explained with reference to FIGS. 1 and 2.

As shown in FIG. 1, a flat type wound electrode group 6 is housed in a case 7. The wound electrode group 6 is formed of a laminate structure comprising a positive electrode 3, a negative electrode 4, and a separator 5 interposed between the positive electrode 3 and the negative electrode 4. The electrode group 6 is obtained by spirally winding the laminate structure noted above. Further, a nonaqueous electrolyte is retained by the wound electrode group 6.

Figure 2:
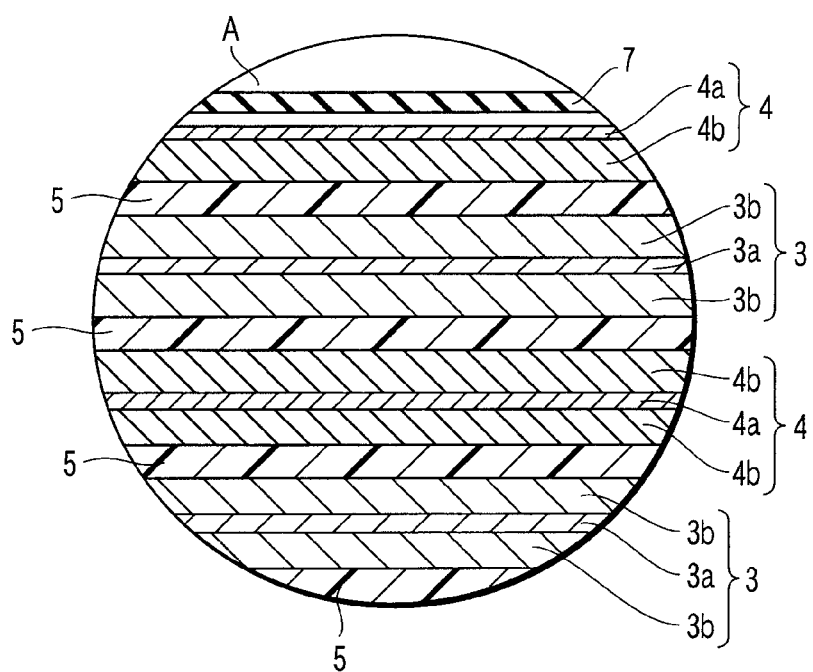
FIG. 2 is a partial sectional view showing the detail of the part enclosed by a circle shown by A in FIG. 1.

As shown in FIG. 2, the negative electrode 4 is positioned to constitute the outermost circumferential region of the wound electrode group 6. Also, the positive electrode 3 and the negative electrode 4 are alternately laminated one upon the other with the separator 5 interposed therebetween. For example, the separator 5, the positive electrode 3, the separator 5, the negative electrode 4, the separator 5, the positive electrode 3 and the separator 5 are laminated one upon the other in the order mentioned. The negative electrode 4 comprises a current collector 4a and an active material-containing layer 4b laminated on the current collector 4a. In that region of the negative electrode 4 which constitutes the outermost circumferential region, the active material-containing layer 4b is formed on one surface of the current collector 4a. On the other hand, the positive electrode 3 comprises a current collector 3a and an active material-containing layer 3b laminated on the current collector 3a.

As shown in FIG. 1, a band-like positive electrode terminal 1 is electrically connected to the current collector 3a in the vicinity of the outer circumferential region of the wound electrode group 6. On the other hand, a band-like negative electrode terminal 2 is electrically connected to the current collector 4a in the vicinity of the outer circumferential region of the wound electrode group 6. Further, the tip portions of the positive electrode terminal 1 and the negative electrode terminal 2 are withdrawn to the outside of the case 7 via the same side of the case 7.

Detail explanations will be furnished as to the negative electrode, nonaqueous electrolyte, positive electrode, separator, case, positive electrode terminal and negative electrode terminal.

1) Negative Electrode

The negative electrode comprises a current collector and an active material-containing layer. The active material-containing layer contains an active material having a lithium ion insertion potential of 0.4V (vs Li/Li$^+$) or more and a carbonaceous material.

Although, as mentioned above, the lithium ion insertion potential of the active material is designed to be 0.4V (vs. Li/Li$^+$) or more, its upper limit is preferably 3V (vs. Li/Li$^+$) and the lithium ion insertion potential is more preferably 0.4V (vs. Li/Li$^+$) or more and 2V (vs Li/Li$^+$) or less.

The active material capable of absorbing lithium ions at a potential range from 0.4V (vs. Li/Li$^+$) to 3V (vs. Li/Li$^+$) is preferably a metal oxide, metal sulfide, metal nitride or alloy.

Examples of such a metal oxide include, for example, titanium-containing metal complex oxides, tin-based oxides such as $SnB_{0.4}P_{0.6}O_{3.1}$ and $SnSiO_3$, silicon-based oxides such as SiO and tungsten-based oxides such as $WO_3$. Among these compounds, titanium-containing metal complex oxides are preferable.

The titanium-containing metal complex oxides mean metal oxides in which the metal component of the metal oxides include titanium. Examples of the titanium-containing metal complex oxide may include titanium oxides and titanium-metal complex oxides. Specific examples of the titanium-containing metal complex oxide may include titanium-based oxides containing no lithium when the oxide is synthesized, lithium-titanium oxides having a spinel structure or rhamsdelite structure, and lithium-titanium complex oxides obtained by substituting a part of the structural elements of lithium-titanium oxides with an another element. Examples of the lithium-titanium oxide having a spinel structure may include $Li_{4+x}Ti_5O_{12}$ (x varies in the range of $0 \leq x \leq 3$, depending on charge and discharge reactions). Examples of the lithium-titanium oxide having a rhamsdelite structure may include $Li_{2+y}Ti_3O_7$ (y varies in the range of $0 \leq y \leq 3$, depending on charge and discharge reactions).

Examples of the titanium-based oxide include $TiO_2$ and metal complex oxides containing Ti and at least one element selected from the group consisting of P, V, Sn, Cu, Ni, Co and Fe. It is desirable for $TiO_2$ to be of anatase type and to have a low crystallinity caused by a heat treating temperature of 300 to 500° C. Examples of metal complex oxides containing Ti and at least one element selected from the group consisting of P, V, Sn, Cu, Ni, Co and Fe may include $TiO_2$—$P_2O_5$, $TiO_2$—$V_2O_5$, $TiO_2$—$P_2O_5$—$SnO_2$ and $TiO_2$—$P_2O_5$-MeO (Me is at least one element selected from the group consisting of Cu, Ni, Co and Fe). This metal complex oxide preferably has a microstructure in which a crystal phase and an amorphous phase coexist or a single phase formed of an amorphous phase exists. Such a microstructure makes it possible to outstandingly improve the cycle performance.

Among titanium-containing metal complex oxides, lithium-titanium oxides and metal complex oxides containing Ti and at least one element selected from the group consisting of P, V, Sn, Cu, Ni, Co and Fe are preferable. A lithium-titanium oxide having a spinel structure is particularly preferable.

Examples of the metal sulfide include titanium-based sulfides such as $TiS_2$, molybdenum-based sulfides such as $MoS_2$ and iron-based sulfides such as FeS, $FeS_2$ and $Li_xFeS_2$ ($0 \leq x \leq 4$).

Examples of the metal nitride include lithium-based nitrides (for example, (Li, Me)$_3$N {Me is a transition metal element}).

The average particle diameter of the active material is preferably designed to be 1 μm or less. For example, mesopores belonging to the second peak exist in a lithium-titanium oxide having a spinel structure and having an average particle diameter of 1 μm or less. This is because the grain growth is retarded, causing small grain size, with the result that either mesopores are produced at the grain boundary or mesopores and macropores belonging to the first peak are introduced in a milling process after a baking step. In this case, if the average particle diameter is too small, the distribution of the nonaqueous electrolyte is inclined toward the negative electrode and there is therefore a fear as to a shortage of the nonaqueous electrolyte at the positive electrode. Therefore, its lower limit is preferably 0.001 μm.

The negative electrode material preferably has an average particle diameter of 1 μm or less and a specific surface area ranging from 5 m$^2$/g to 50 m$^2$/g when measured by a BET method utilizing N$_2$ adsorption. This makes it easy to control the distribution of diameters of the negative electrode in the range defined in this embodiment and it is therefore possible to improve the impregnating ability of the negative electrode with the nonaqueous electrolyte.

The porosity of the negative electrode (excluding the current collector) is preferably in the range of 20% to 50%. A negative electrode having high affinity with the nonaqueous electrolyte and also having a high density can be thereby obtained. The porosity is more preferably in the range of 25% or more and 40% or less.

The density of the negative electrode is preferably 2 g/cc or more. When the density of the negative electrode is designed to be less than 2 g/cc, there is a fear that a negative electrode having the aforementioned diameter distribution is not obtained. The density of the negative electrode is more preferably 2 g/cc or more and 2.5 g/cc or less.

It is desirable for the current collector of the negative electrode to be formed of aluminum foil or aluminum alloy foil. It is also desirable for the current collector to have an average crystal grain size not larger than 50 μm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the current collector in an over-discharge cycle under an environment of a high temperature not lower than, for example, 40° C., it is possible to suppress the elevation in the impedance of the negative electrode. Further, it is possible to improve the high-rate performance, the rapid charging performance, and the charge-discharge cycle performance of the battery. It is more desirable for the average crystal grain size of the current collector to be not larger than 30 μm, furthermore desirably, not larger than 5 μm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1\times10^6/n$ (μm$^2$)", where n denotes the number of crystal grains noted above. Further, the average crystal grain size d (μm) is calculated from the area S by formula (1) given below:

$$d=2(S/\pi)^{1/2} \quad (1)$$

The aluminum foil or the aluminum alloy foil having the average crystal grain size not larger than 50 μm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, more desirably not larger than 15 μm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

Examples of the carbonaceous material contained in the conductive agent include acetylene black, carbon black, coke, carbon fiber and graphite. Cokes that are obtained by heat treatment at 800 to 2000° C. and have an average particle diameter of 10 μm or less, graphite, and carbon fibers having an average particle diameter of 1 μm or less are more preferable. The specific surface area of the carbonaceous material is preferably 10 m$^2$/g or more when measured by a BET method utilizing $N_2$ adsorption. As the conductive agent, a metal powder such as an aluminum powder or conductive ceramics such as TiO may be used together though only a carbonaceous material may be used.

The active material-containing layer may contain a binder. Examples of the binder include polytetrafluoroethylene (PTFE), polyvinylidene fluoride (PVdF), fluoro rubber, styrene-butadiene rubber and core-shell binder.

Each proportion of the active material, conductive agent and binder to be compounded is preferably in the following range: active material: 70% by weight or more and 96% by weight or less, conductive agent: 2% by weight or more and 28% by weight or less, and binder: 2% by weight or more and 28% by weight or less. When the amount of the conductive agent is less than 2% by weight, there is a fear that the current collective ability of the active material-containing layer is deteriorated and therefore, the large-current performance of the nonaqueous electrolyte battery is deteriorated. Also, when the amount of the binder is less than 2% by weight, the binding ability between the active material-containing layer and the current collector is deteriorated and there is therefore a possibility that the cycle performance is deteriorated. On the other hand, each of the conductive agent and the binder is preferably 28% by weight or less from the viewpoint of obtaining a high capacity.

The negative electrode is manufactured by suspending the active material, conductive agent (carbonaceous material) and binder in a common solvent to prepare a slurry, which is then applied to the current collector and dried to produce an active material-containing layer, followed by pressing. At this time, the slurry is prepared in the following manner. First, the active material, conductive agent and binder are poured into a small amount of solvent and the mixture is kneaded in, for example, a planetary mixer under the condition that the solid ratio, which is the ratio of the active material, conductive agent and binder to the solvent, is large, to apply a strong shearing force, thereby dispersing the solid components uniformly. At this time, if the solid ratio is insufficiently high, the shearing force is so small that the coagulated active material is insufficiently crushed and therefore the solid components are not dispersed uniformly. The importance of this process increases as the particle diameter of the active material decreases. This process is particularly important in the case of handling particles having an average particle diameter of 1 μm or less. After the mixture is well kneaded under the condition that the solid ratio is high, the solvent is added to reduce the solid ratio gradually, thereby adjusting an applicable viscosity. The slurry adjusted to an applicable viscosity is further mixed thoroughly in a bead mill using ceramic balls as media. This process ensures that the edges of the active material particles are flattened to smooth the surface of the active material particles, enabling close packing, therefore the distribution of diameters can be shifted to the small pore diameter side, whereby a negative electrode having the distribution of diameter as described in this embodiment is obtained. At this time, as the ceramic balls, various materials such as glass, alumina, mullite and silicon nitride may be used. It is however preferable to use balls made of zirconia from the viewpoint of abrasive resistance and impact resistance. The diameter of a ball is preferably 0.5 to 5 mm. If the diameter of a ball is less than 0.5 mm, the impact resistance is reduced. Also, when the diameter of a ball exceeds 5 mm, the contact area among media is reduced, bringing about a reduced kneading ability. The diameters of the balls are more preferably in the range of 1 to 3 mm.

The obtained slurry is applied to the current collector, dried and then pressed by a roll to complete the negative electrode. At this time, the temperature of the roll is preferably designed to be 40 to 180° C. When the temperature of the roll is low, the conductive agent having a specific gravity lower than that of the active material comes floating to the surface of the electrode during pressing, and therefore a high-density electrode having proper pores is not obtained, resulting in deterioration in the ability of impregnating with the nonaqueous electrolyte. Also, the performance of the battery is deteriorated.

When the temperature of the roll is higher than 180° C., crystallization of the binder progresses, so that the flexibility of the electrode is reduced, with the result that the active material-containing layer is easily broken or peeled off. This results in reduced productivity and in reduction in battery performance such as output performance and charge and discharge cycle performance. The temperature of the roll is more preferably 90 to 150° C.

2) Nonaqueous Electrolyte

Examples of the nonaqueous electrolyte include liquid nonaqueous electrolytes prepared by dissolving an electrolyte in an organic solvent and gel nonaqueous electrolytes obtained by making a composite of liquid nonaqueous electrolytes and polymer materials. Though the nonaqueous electrolyte may have any form, it contains first sultones having an unsaturated hydrocarbon group in any form. This is because when the first sultones are added, it is possible to selectively form a thin and close film on the surface of the negative electrode active material and a thick film on the surface of the negative electrode conductive agent, whereby the generation of gas from the negative electrode when the battery is stored at high temperatures can be efficiently suppressed without deteriorating the large-current performance and cycle performance. Also, the film formed thinly and closely on the surface of the negative electrode active material has the effect of suppressing self discharge when the battery is stored.

Specific examples of the first sultones may include ethylene sultone, 1,3-propene sultone, 1,4-butene sultone, 1,5-pentene sultone, 1-methyl-1,3-propene sultone, 1-fluoro-1,3-propene sultone, 2-methyl-1,3-propene sultone, 3-methyl-1,3-propene sultone and 1-trifluoromethyl-1,3-propene sultone. Among these compounds, 1,3-propene sultone and 1,4-butene sultone are preferable.

The content of the first sultones is preferably 0.001% by weight or more and 10% by weight or less with respect to the total weight of the nonaqueous electrolyte. When the content is less than 0.001% by weight, a good effect on a restriction of the generation of gas is not obtained, whereas when the content exceeds 10% by weight, the film is formed thickly and non-densely and the resistance of the negative electrode is increased. The content is more preferably 0.01% by weight or more and 2% by weight or less.

The nonaqueous electrolyte may further contain second sultones having a saturated hydrocarbon group in addition to the above first sultones.

As examples of the second sultones, 1,3-propane sultone, 1,4-butane sultone, 1,5-pentane sultone, 1,6-hexane sultone, 1-methyl-1,3-propane sultone, 2-methyl-1,3-propane sultone, 3-methyl-1,3-propane sultone, 1-methyl-1,4-butane sultone, 2-methyl-1,4-butane sultone, 3-methyl-1,4-butane sultone and 4-methyl-1,4-butane sultone may be exemplified. Among these compounds, 1,3-propane sultone and 1,4 butane sultone are preferable.

The addition of the second sultones ensures the formation of a more stable protective film having a lower resistance on the surface of the negative electrode active material.

The content of the second sultones is preferably 0.001% by weight or more and 10% by weight or less with respect to the total weight of the nonaqueous electrolyte. When the content is less than 0.001% by weight, the surface film of the negative electrode active material makes it more difficult to reduce its resistance, whereas when the content exceeds 10% by weight, the second sultones are decomposed and gasified under a high-temperature condition. The content is more preferably 0.01% by weight or more and 2% by weight or less.

As the nonaqueous electrolyte, one containing a nonvolatile and nonflammable ionic liquid may be used.

The liquid nonaqueous electrolyte is prepared by dissolving an electrolyte at a concentration of 0.5 mol/L or more and 2.5 mol/L or less in an organic solvent.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethasulfonate ($LiCF_3SO_3$) and bistrifluoromethylsulfonylimide lithium ($LiN(CF_3SO_2)_2$). The number of types of electrolyte may be designed to be one or two or more. The electrolyte is preferably those resistant to oxidation even at a high potential, and $LiPF_6$ is most preferable.

Examples of the organic solvent include single compounds or a mixture of compounds selected from cyclic carbonates such as propylene carbonate (PC), ethylene carbonate (EC) and vinylene carbonate, chain carbonates such as diethyl carbonate (DEC), dimethyl carbonate (DMC) and methylethyl carbonate (MEC), cyclic ethers such as tetrahydrofuran (THF), 2-methyltetrahydrofuran (2MeTHF) and dioxolan (DOX), chain ethers such as dimethoxyethane (DME) and diethoxyethane (DEE), γ-butyrolactone (GBL), acetonitrile (AN) and sulfolane (SL).

Examples of the polymer materials include polyvinylidene fluoride (PVdF), polyacrylonitrile (PAN) and polyethylene oxide (PEO).

Preferable examples of the organic solvent include mixtures of two or more solvents selected from the group consisting of propylene carbonate (PC), ethylene carbonate (EC) and γ-butyrolactone. More preferable examples of the organic solvent include γ-butyrolactone (GBL). The reason is as follows.

First, the reason is that γ-butyrolactone, propylene carbonate and ethylene carbonate each have a high boiling point or flash point and are excellent in heat stability.

Secondly, γ-butyrolactone is reduced more easily than chain carbonates and cyclic carbonates. It can form a more stable protective film in combination with the first sultones during reduction. Specifically, γ-butyrolactone>>>ethylene carbonate>propylene carbonate>>dimethyl carbonate>methylethyl carbonate>diethyl carbonate are reduced more easily and are increased in applicability in this order. An increase in the number of the symbols ">" shows an increase in the difference of reactivity between solvents.

For this reason, if γ-butyrolactone is contained in the electrolyte, a good film can be formed on the surface of lithium-titanium oxide even in the operational potential zone of lithium-titanium oxide. As a result, self discharge can be suppressed and the high-temperature storage performance of the nonaqueous electrolyte battery can be improved.

With regard to the foregoing solvents, similar explanations may be applied.

Also, the same effect is obtained in an easily reducible ionic liquid. Further, in the case of the ionic liquid, it is also easily oxidized and therefore it acts on the positive electrode, exerting the effects of suppressing self-discharge and improving the cycle life.

In order to form a protective film having higher quality, the content of γ-butyrolactone is designed to be preferably 40% by volume or more and 95% by volume or less with respect to the organic solvent.

A nonaqueous electrolyte containing γ-butyrolactone has a high viscosity and therefore impregnation into the electrode is deteriorated though producing the foregoing excellent effect. However, if a negative electrode active material having an average particle diameter of 1 μm or less is used, even a nonaqueous electrolyte containing γ-butyrolactone can be smoothly impregnated with the negative electrode and it is therefore possible to improve productivity and also output performance and cycle performance. Furthermore, the same effect is produced also in the case of using an ionic liquid having a high viscosity.

Next, explanations will be given as to the nonaqueous electrolyte containing an ionic liquid.

The ionic liquid means a salt in which at least a part thereof presents a liquid state at room temperature, wherein the room temperature means a temperature range where power sources are estimated to be usually operated. The temperature range where power sources are usually operated means a temperature range of which the upper limit is about 120° C. or about 60° C. depending on the case and the lower limit is about −40° C. or about −20° C. depending on the case. Among the temperature ranges, a range from −20° C. to 60° C. is preferable.

As the ionic liquid containing lithium ions, an ionic liquid constituted of a lithium ion, an organic cation and an organic anion is preferably used. Also, this ionic liquid is preferably in a liquid state also at temperatures lower than the room temperature.

Examples of the aforementioned organic cation include an alkylimidazolium ion or a quaternary ammonium ion having the skeleton shown by the following formula 1.
[Formula 1]

Chemical formula (1)

As the above alkylimidazolium ion, a dialkylimidazolium ion, trialkylimidazolium ion and tetraalkylimidazolium ion and the like are preferable. As the dialkylimidazolium ion, a 1-methyl-3-ethylimidazolium ion ($MEI^+$) is preferable. As the trialkylimidazolium ion, a 1,2-diethyl-3-propylimidazolium ion ($DMPI^+$) is preferable. As the tetraalkylimidazolium ion, a 1,2-diethyl-3,4(5)-dimethylimidazolium ion is preferable.

As the above quaternary ammonium ion, a tetraalkylammonium ion, a cyclic ammonium ion and the like are preferable. As the tetraalkylammonium ion, a dimethylethylmethoxyammonium ion, dimethylethylmethoxymethylammonium ion, dimethylethylethoxyethylammonium ion and trimethylpropylammonium ion are preferable.

When the above alkylimidazolium ion or a quaternary ammonium ion (especially, a tetraalkylammonium ion) is used, the melting point is designed to be preferably 100° C. or less and more preferably 20° C. or less. Also, the reactivity with the negative electrode can be reduced.

The concentration of the above lithium ion is preferably 20 mol % or less. The concentration is more preferably in the range of 1 mol % to 10 mol %. When the concentration is made to be in the above range, an ionic liquid can stability exist at a temperature as low as 20° C. or less. Also, the viscosity can be lowered at temperatures equal to or lower than room temperature and the ion conductivity can be heightened.

The above organic anion preferably coexists with one or more anions selected from, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$ and $(CF_3SO_2)_3C^-$. The coexistence with plural anions makes it possible to form an ionic liquid having a melting point of 20° C. or less and preferably 0° C. or less. More preferable examples of the anion include $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$ and $(CF_3SO_2)_3C^-$. An ionic liquid having a melting point of 0° C. or less is formed more easily by these anions.

3) Positive Electrode

The positive electrode has a current collector and an active material-containing layer which is laminated on one or both surfaces of the current collector and contains an active material, a conductive agent and a binder.

Examples of the active material include oxides, sulfides and polymers.

Examples of the oxides include manganese dioxide ($MnO_2$) absorbing Li, iron oxide, copper oxide, nickel oxide, lithium-manganese complex oxide (for example, $Li_xMn_2O_4$ or $Li_xMnO_2$), lithium-nickel complex oxide (for example, $Li_xNiO_2$), lithium-cobalt complex oxide (for example, $Li_xCoO_2$), lithium-nickel-cobalt complex oxide (for example, $LiNi_{1-y}Co_yO_2$), lithium-manganese-cobalt complex oxide (for example, $LiMn_yCo_{1-y}O_2$), spinel type lithium-manganese-nickel complex oxide (for example, $Li_xMn_{2-y}Ni_yO_4$), lithium phosphates having an olivine structure (for example, $Li_xFePO_4$, $Li_xFe_{1-y}Mn_yPO_4$ and $Li_xCoPO_4$), iron sulfate (for example, $Fe_2(SO_4)_3$), vanadium oxide (for example $V_2O_5$) and lithium-nickel-cobalt-manganese complex oxide. In the above oxides, x and y are respectively preferably in the range of 0 to 1.

Examples of the polymer include conductive polymer materials such as polyaniline and polypyrrole and disulfide-based polymer materials. Besides the above compounds, sulfur (S), fluorocarbon and the like may be used.

Examples of the active material which can provide a high positive electrode potential include a lithium-manganese complex oxide, lithium-nickel complex oxide, lithium-cobalt complex oxide, lithium-nickel-cobalt complex oxide, spinel type lithium-manganese-nickel complex oxide, lithium-manganese-cobalt complex oxide, lithium iron phosphate and lithium-nickel-cobalt-manganese complex oxide.

The above lithium-nickel-cobalt-manganese complex oxide preferably has the following composition: $Li_aNi_bCo_cMn_dO_2$ (wherein the following relationship is established among molar ratios a, b, c and d: $0 \leq a \leq 1.1$, $0.1 \leq b \leq 0.5$, $0 \leq c \leq 0.9$, $0.1 \leq d \leq 0.5$).

Among these compounds, lithium iron phosphate, $Li_xVPO_4F$, lithium-manganese complex oxide, lithium-nickel complex oxide or lithium-nickel-cobalt complex oxide is preferably used from the viewpoint of cycle life when a nonaqueous electrolyte containing an ionic liquid is used. This is because the reactivity between the above active material and the ionic liquid is reduced.

The active material is particularly preferably a lithium-transition metal oxide having a layered crystal structure. Examples of the layered crystal structure may include a layered halite type structure. The lithium-transition metal oxide having a layered crystal structure is preferably selected from the group consisting of a lithium-cobalt complex oxide, lithium-nickel complex oxide and lithium-manganese complex oxide. This is because these compounds each provide a high average working voltage in a charge-discharge cycles. Specific examples of these compounds include lithium cobalt oxide (for example, $Li_xCoO_2$), lithium-manganese complex oxide ($Li_xMnO_2$) and lithium-nickel complex oxide (for example, $Li_xNiO_2$), and also include lithium-nickel-cobalt complex oxide (for example, $LiNi_{1-y}Co_yO_2$) and lithium-manganese-cobalt complex oxide (for example, $LiMn_yCo_{1-y}O_2$). In this case, x and y is respectively preferably 0 or more and 1 or less.

Also, examples of the active material for a primary battery include manganese dioxide, iron oxide, copper oxide, iron sulfide and fluorocarbon.

The primary particle diameter of the active material is preferably 100 nm or more and 1 μm or less. When the primary particle diameter is 100 nm or more, the active material is easily handled in industrial production. When the primary particle diameter is 1 μm or less, lithium ions are easily diffused in a solid smoothly.

The specific surface area of the active material is preferably 0.1 m$^2$/g or more and 10 m$^2$/g or less. When the specific surface area of the active material is 0.1 m$^2$/g or more, the sites where lithium ions are inserted in and released from can be secured sufficiently. When the specific surface area of the active material is 10 m$^2$/g or less, it is easily handled in industrial production and a good charge-discharge cycle performance can be secured.

Examples of the conductive agent used to improve the current collecting performance and to suppress the contact resistance with the current collector include carbonaceous materials such as acetylene black, carbon black and graphite.

Examples of the binder used to bind the active material with the conductive agent include polytetrafluoroethylene (PTFE), polyvinylidene fluoride (PVdF) and fluoro rubber.

Each proportion of the active material, conductive agent and binder to be compounded is preferably in the following range: active material: 80% by weight or more and 95% by weight or less, conductive agent: 3% by weight or more and 18% by weight or less, and binder: 2% by weight or more and 17% by weight or less. When the conductive agent is 3% by weight or more, the above effect can be produced, and when the conductive agent is 18% by weight or less, decomposition of the nonaqueous electrolyte on the surface of the conductive agent when the battery is stored at high temperatures can be reduced. When the binder is 2% by weight or more, sufficient electrode strength is obtained and when the binder is 17% by weight or less, the amount of the insulating material is reduced, thereby making it possible to decrease the internal resistance.

The positive electrode is manufactured, for example, by suspending the active material, conductive agent and binder in a proper solvent to prepare a slurry, which is then applied to the current collector and dried to produce an active material-containing layer, followed by pressing. In addition, the active material, the conductive agent and the binder may be formed into a pellet form to use it as an active material-containing layer.

It is desirable for the current collector to be formed of an aluminum foil or an aluminum alloy foil. It is desirable for the aluminum foil or the aluminum alloy foil forming the current collector to have an average crystal grain size not larger than 50 μm. It is more desirable for the average crystal grain size noted above to be not larger than 30 μm, and furthermore desirably not larger than 5 μm. Where the average crystal grain size of the aluminum foil or the aluminum alloy foil forming the current collector is not larger than 50 μm, the mechanical strength of the aluminum foil or the aluminum alloy foil can be drastically increased to make it possible to press the positive electrode with a high pressure. It follows that the density of the positive electrode can be increased to increase the battery capacity.

The aluminum foil or the aluminum alloy foil having the average crystal grain size not larger than 50 μm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

4) Separator

Examples of the material of the separator include porous films containing polyethylene, polypropylene, cellulose or polyvinylidene fluoride (PVdF) and nonwoven fabrics made of synthetic resins. Among these materials, porous films made of polyethylene or polypropylene can be each melted at a predetermined temperature to cut off current, and are therefore preferable from the viewpoint of improving safety.

The inventors of the present invention have found that the distribution of diameters of pores of the separator has a correlation with the large-current performance or high-temperature storage performance (particularly, durability in a charged state) of the nonaqueous electrolyte battery.

The large-current performance of the battery is more improved when many fine pores having a large diameter are present in the separator, specifically, in the case where the median diameter is larger than the mode diameter when the distribution of pore diameter of the separator is measured. Also, when as the active material of the negative electrode, one having a lithium ion insertion potential of 0.4V (vs. Li/Li$^+$) or more is used, the precipitation of lithium on the surface of the negative electrode can be suppressed, preventing the development of an internal short circuit even in the case where pores having a large diameter are present in the separator.

Specifically, if a separator in which the median diameter is larger than the mode diameter when the distribution of pore diameter of the separator is measured is used and, as the active material of the negative electrode, one having a lithium ion insertion potential 0.4V (vs. Li/Li$^+$) or more is used, the large-current performance can be improved without developing an internal short circuit.

Moreover, when the separator and the active material of the negative electrode having the aforementioned physical properties are combined, the high-temperature storage performance is outstandingly improved. The reason is as follows.

The separator is increased in resistance as it is greatly exposed in a high-temperature condition or as it is greatly exposed to a high-potential condition of an oxidation atmosphere. Specifically, the resistance of the separator is increased because of the denaturing of the separator, the deposition of products produced by a side reaction on the surface of the electrode, and the clogging of the separator. Therefore, the performance of the battery is deteriorated. At this time, a part of a decomposed product produced at the interface between the positive electrode and the nonaqueous electrolyte tends to deposit on the surface of the negative electrode having a low potential.

Since the potential of the negative electrode is made high by using the above active material, the decomposed product is scarcely precipitated on the negative electrode. Also, the separator having the above physical properties is able to suppress the clogging resulting from the contact of the separator with the negative electrode and also the clogging resulting from the denaturing of the separator. For this reason, even if the battery is exposed to a high-temperature condition in a charged state, it is possible to remarkably suppress reduction in large-current performance.

In the separator, the median diameter of pores when measured by mercury porosimetry is preferably 0.15 µm or more and 1 µm or less. When the median diameter is less than 0.15 µm, the film resistance of the separator is increased, resulting in low output. Also, when the median diameter of pores exceeds 2 µm, the current shutdown unequally occurs in the separator, leading to reduced safety, and besides, the diffusion of the nonaqueous electrolyte due to a capillary phenomenon is scarcely caused, inducing a cycle deterioration due to a shortage of the nonaqueous electrolyte. The median diameter of pores is more preferably in the range of 0.18 µm or more and 0.40 µm or less.

With regard to the separator, the mode diameter of pores when measured by mercury porosimetry is preferably 0.12 µm or more and 0.5 µm or less. When the mode diameter is less than 0.12 µm, the film resistance of the separator is increased, resulting in low output. Also, the separator is denatured under a high-temperature and high-voltage circumstance so that pores are crushed, with the result that the output is reduced. Further, when the mode diameter of pores exceeds 0.5 µm, the current shutdown unequally occurs in the separator, leading to low safety. The mode diameter of pores is more preferably in the range of 0.18 µm or more and 0.35 µm or less.

The porosity of the separator is preferably 45% or more and 75% or less. When the porosity is less than 45%, the absolute amount of ions in the separator is small and therefore the output is reduced. When the porosity exceeds 75%, the strength of the separator is reduced and also, the current shutdown unequally occurs in the separator, leading to low safety. The porosity is more preferably in the range of 50% to 60%.

5) Case

Examples of the case include a laminate film case having a wall thickness of 0.2 mm or less and a metal case having a wall thickness of 0.5 mm or less. The wall thickness of the metal case is more preferably 0.2 mm or less.

Examples of the shape of the case include a flat type, rectangular type, cylinder type, coin type, button type, sheet type and laminate type. As to the shape of the case, of course, small batteries to be mounted on portable electronic devices and large batteries to be mounted on two-wheel to four-wheel cars may be included.

The laminate film is a multilayer film consisting of a metal layer and a resin layer with which the metal layer is coated. To develop a light-weight battery, the metal layer is preferably an aluminum foil or an aluminum alloy foil. The resin layer serves to reinforce the metal layer and polymers such as polypropylene (PP), polyethylene (PE), nylon and polyethylene terephthalate (PET) may be used. The laminate film case may be formed by carrying out thermal fusion to seal the laminate film.

Examples of the material of the metal case include aluminum and aluminum alloys. As the aluminum alloy, alloys containing an element such as magnesium, zinc or silicon are preferable. On the other hand, the content of transition metals such as iron, copper, nickel or chromium is preferably designed to be 1% or less. This makes it possible to outstandingly improve long-term reliability in a high-temperature condition and radiation ability.

A metal can made of aluminum or an aluminum alloy has an average crystal grain size of preferably 50 µm or less, more preferably 30 µm or less and still more preferably 5 µm or less. When the above average crystal grain size is designed to be 50 µm or less, the strength of the metal can made of aluminum or an aluminum alloy can be increased outstandingly, enabling the can to be more thinned. As a result, a battery can be realized which is light-weight, has high output, is excellent in long-term reliability and is appropriately mounted on vehicles.

6) Negative Electrode Terminal

The negative electrode terminal may be formed from a material having electric stability and conductivity at a potential range from 0.4 to 3V with respect to a lithium metal potential. Example of this material include aluminum and aluminum alloys containing elements such as Mg, Ti, Zn, Mn, Fe, Cu and Si. In order to reduce contact resistance, the material is preferably the same as that of the negative electrode current collector.

7) Positive Electrode Terminal

The positive electrode terminal may be formed from a material having electric stability and conductivity at a potential range from 3V to 5V with respect to a lithium metal potential. Example of this material include aluminum and aluminum alloys containing elements such as Mg, Ti, Zn, Mn, Fe, Cu and Si. In order to reduce contact resistance, the material is preferably the same as that of the positive electrode current collector.

Explanations have been furnished as to an example of a nonaqueous electrolyte battery according to the first embodiment with reference to FIGS. 1 and 2, in the case where the electrode group of the positive electrode and the negative electrode is a coiled electrode. In order for the battery to have high safety and reliability in addition to excellent large-current performance and charge storage performance at high temperatures, the electrode group preferably has a laminate structure. One example of this structure is shown in FIGS. 3 and 4.

Figure 3:
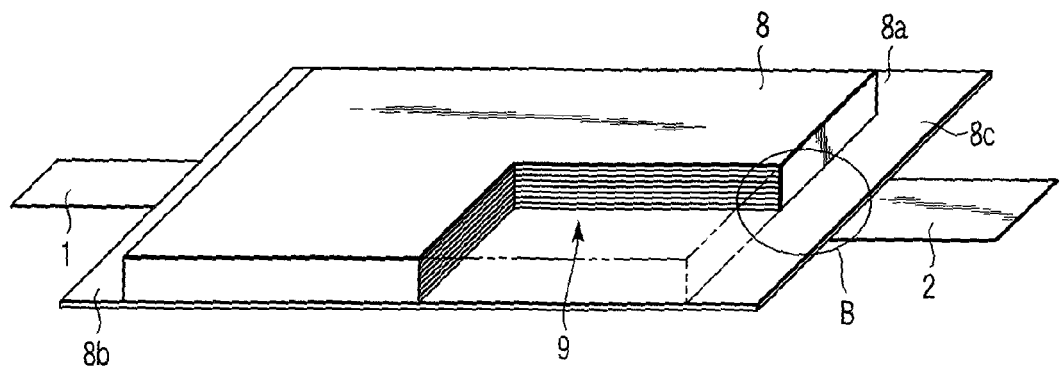
FIG. 3 is a partially broken perspective view showing another nonaqueous electrolyte battery according to the first embodiment.
Figure 4:
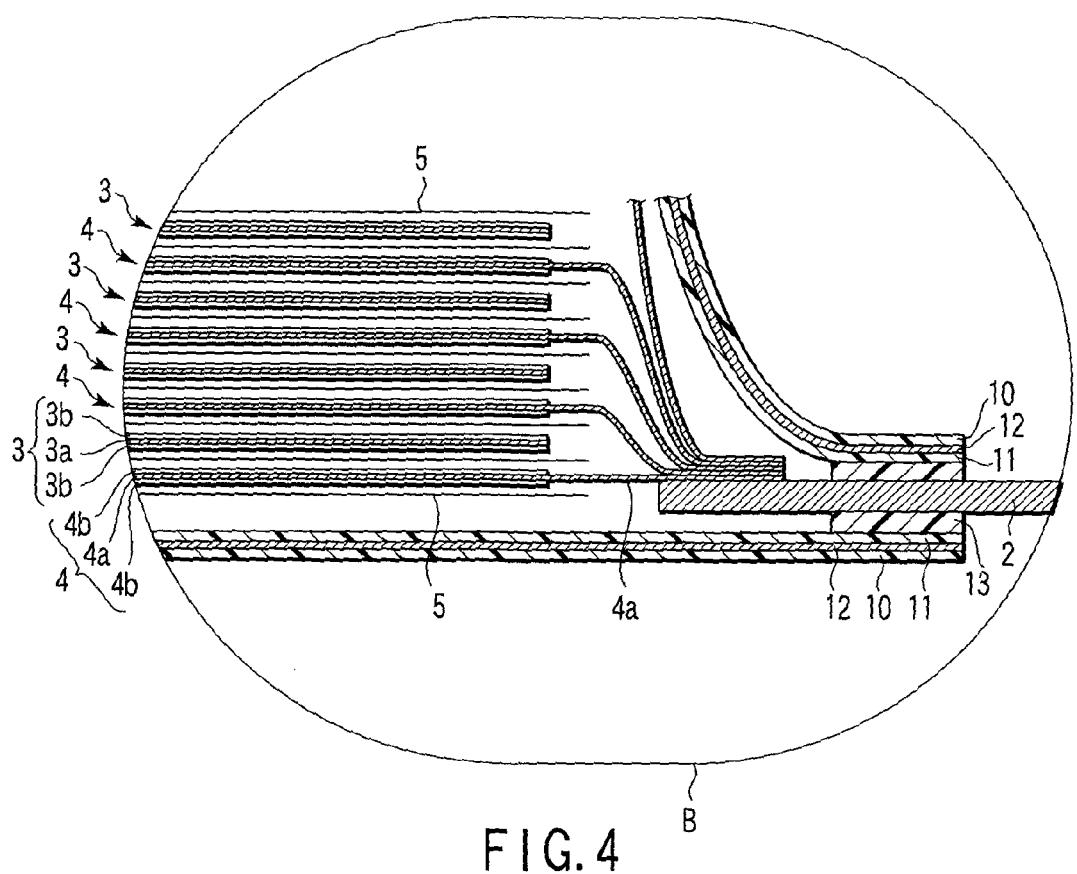
FIG. 4 is a partial sectional view showing the part enclosed by a circle shown by B in FIG. 3.

As shown in FIG. 3, a laminated electrode group 9 is housed in the case 8 made of the laminate film. As show in FIG. 4, the laminate film comprises, for example, a resin layer 10, a thermoplastic resin layer 11, and a metal layer 12 disposed between the resin layer 10 and thermoplastic resin layer 11. The thermoplastic resin layer 11 is located on the inner surface of the case 8. Heat-seal portions 8a, 8b and 8c are formed by thermal adhesion of the thermoplastic resin layer 11 at one longer edge and both shorter edges of the case 8 made of the laminate film. The case 8 is sealed with the heat-seal portions 8a, 8b and 8c. As show in FIG. 4, the laminated electrode group 9 has a structure in which the positive electrodes 3 and negative electrodes 4 are alternately laminated with interposition of the separators 5 between them. Plural positive electrodes 3 are used, and each electrode comprises a current collector 3a and an active material-containing layers 3b laminated on both surfaces of the current collector 3a. Plural negative electrodes 4 are used, and each electrode comprises a current collector 4a and an active material-containing layers 4b laminated on both surfaces of the current collector 4a. One edge of the current collector 4a of the negative electrode 4 is protruded out of the positive electrode 3. The current collector 4a protruded out of the positive electrode 3 is electrically connected to the belt-like negative electrode terminal 2. The tip of the belt-like negative electrode terminal 2 is pulled out to the outside through the heat seal portion 8c of the case 8. Both surfaces of the negative electrode terminal 2 are opposed to the thermoplastic resin layers 11 that constitute the heat seal portion 8c. An insulation film 13 is inserted between each surface of the negative electrode terminal 2 and the thermoplastic resin layer 11 for improving the bonding strength between the heat seal portion 8c and the negative electrode terminal 2. An example of the insulation film 13 is a film formed of a material prepared by adding an acid anhydride to a polyolefin that contains at least one of polypropylene and polyethylene. The edge of the current collector 3a of the positive electrode 3 is protruded out of the negative electrode 4, although this configuration is not illustrated in the drawing. The edge of the current collector 3a is positioned at an opposed side to the protruded edge of the current collector 4a. The current collector 3a protruded out of the negative electrode 4 is electrically connected to the belt-like positive electrode terminal 1. The tip of the belt-like positive electrode terminal 1 is pulled out through the heat seal portion 8b of the case 8. The insulation film 13 is interposed between the positive electrode terminal 1 and the thermoplastic resin layer 11 for improving bonding strength between the heat seal portion 8b and the positive electrode terminal 1. The direction in which the positive electrode terminal 1 is pulled out of the case 8 is opposed to the direction in which the negative electrode terminal 2 is pulled out of the case 8, as is evident from the above-described construction.

Figure 5:
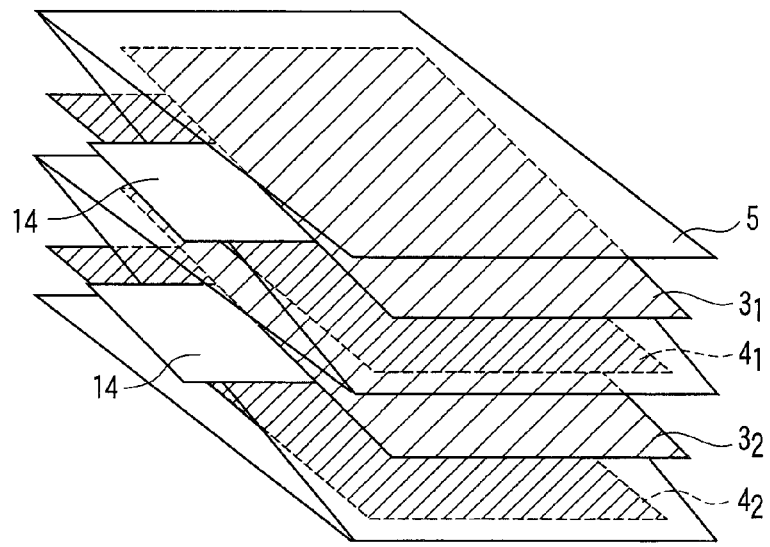
FIG. 5 is a perspective view showing an electrode group of a laminate structure used in a nonaqueous electrolyte battery according to the first embodiment.

In order to attain high large-current performance also when the battery is used for a long term, the electrode group including the positive electrode and the negative electrode is preferably a laminate structure and the separator is folded in a zigzag shape prior to use as shown in FIG. 5. A band-shaped separator 5 is folded in a zigzag shape. A strip-like positive electrode $3_1$, a strip-like negative electrode $4_1$, a strip-like positive electrode $3_2$ and a strip-like negative electrode $4_2$ are inserted in this order from above on the overlapped part of the separators 5. A positive electrode terminal 14 is drawn from each short side of the strip-like positive electrodes $3_1$ and $3_2$. An electrode group having a laminate structure is obtained by alternately disposing the positive electrode 3 and the negative electrode 4 between the overlapped parts of the separator 5 folded in a zigzag shape.

When the separator is folded in a zigzag shape, three sides of each of the positive electrode and negative electrode are brought into direct contact with the nonaqueous electrolyte and therefore, the nonaqueous electrolyte is smoothly moved to the electrode. Therefore, even if the nonaqueous electrolyte is consumed on the surface of the electrode during long-term use, the nonaqueous electrolyte is smoothly supplied, with the result that an excellent large-current performance (output/input performance) can be attained over a long period of time.

Second Embodiment

A battery pack according to a second embodiment has nonaqueous electrolyte batteries according to the first embodiment as unit cells. Each unit cell is arranged electrically in series or in parallel and constitutes a battery module.

The unit cell according to the first embodiment is suitable for use as a battery module and the battery pack according to the second embodiment is excellent in cycle performance. Explanations will be furnished concerning this reason.

If the impregnation of the nonaqueous electrolyte is improved, most of the surface of the negative electrode active material can be brought into contact with the nonaqueous electrolyte and the concentration of lithium ions in the negative electrode active material is equalized with ease. As a result, it becomes difficult for an overvoltage to be applied. Specifically, local overcharge and over discharge are scarcely caused and the utilization of the negative electrode active material can be equalized. This ensures that an individual difference in the capacity of the unit cell and an individual difference in the impedance of the unit cell can be much reduced. As a result, fluctuation of the voltage of the unit cell at a fully charged state due to individual difference of the capacity can be reduced, for example, in the battery module in which the unit cells are connected in series. For this reason, the battery pack according to the second embodiment has excellent controllability of a battery module and is able to improve the cycle performance.

As the unit cell, a flat type nonaqueous electrolyte battery shown in FIG. 1 or 3 may be used.

Figure 7:
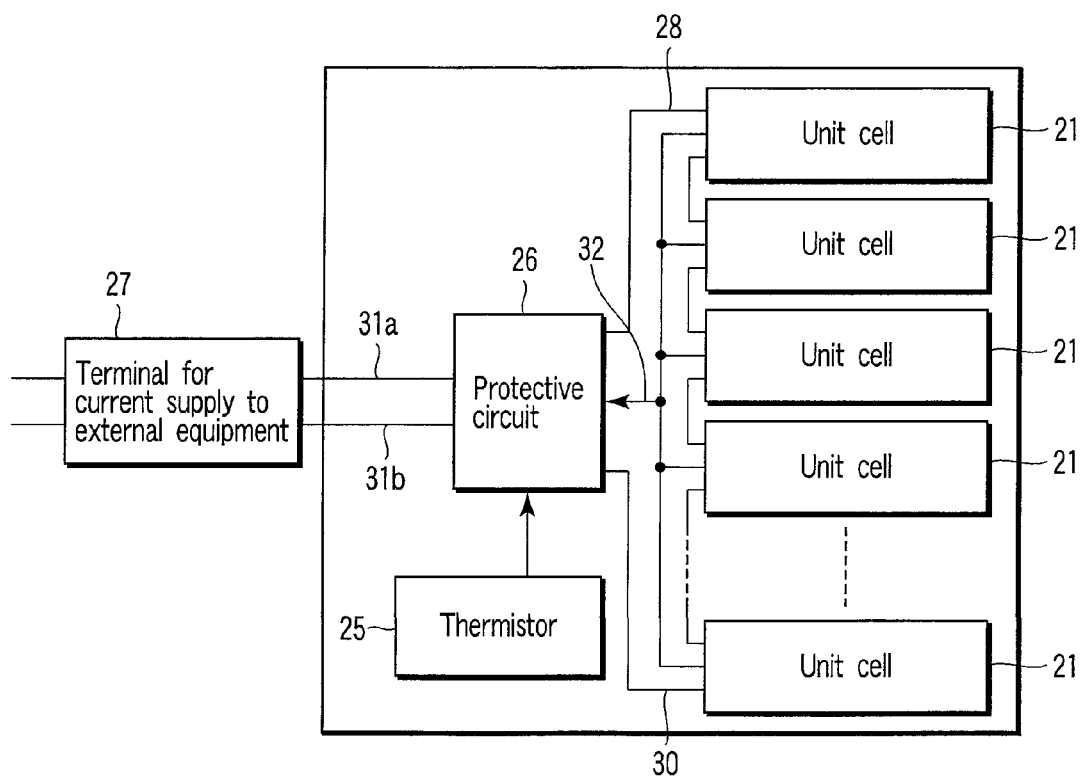
FIG. 7 is a block diagram showing an electric circuit of the battery pack of FIG. 6.
Figure 6:
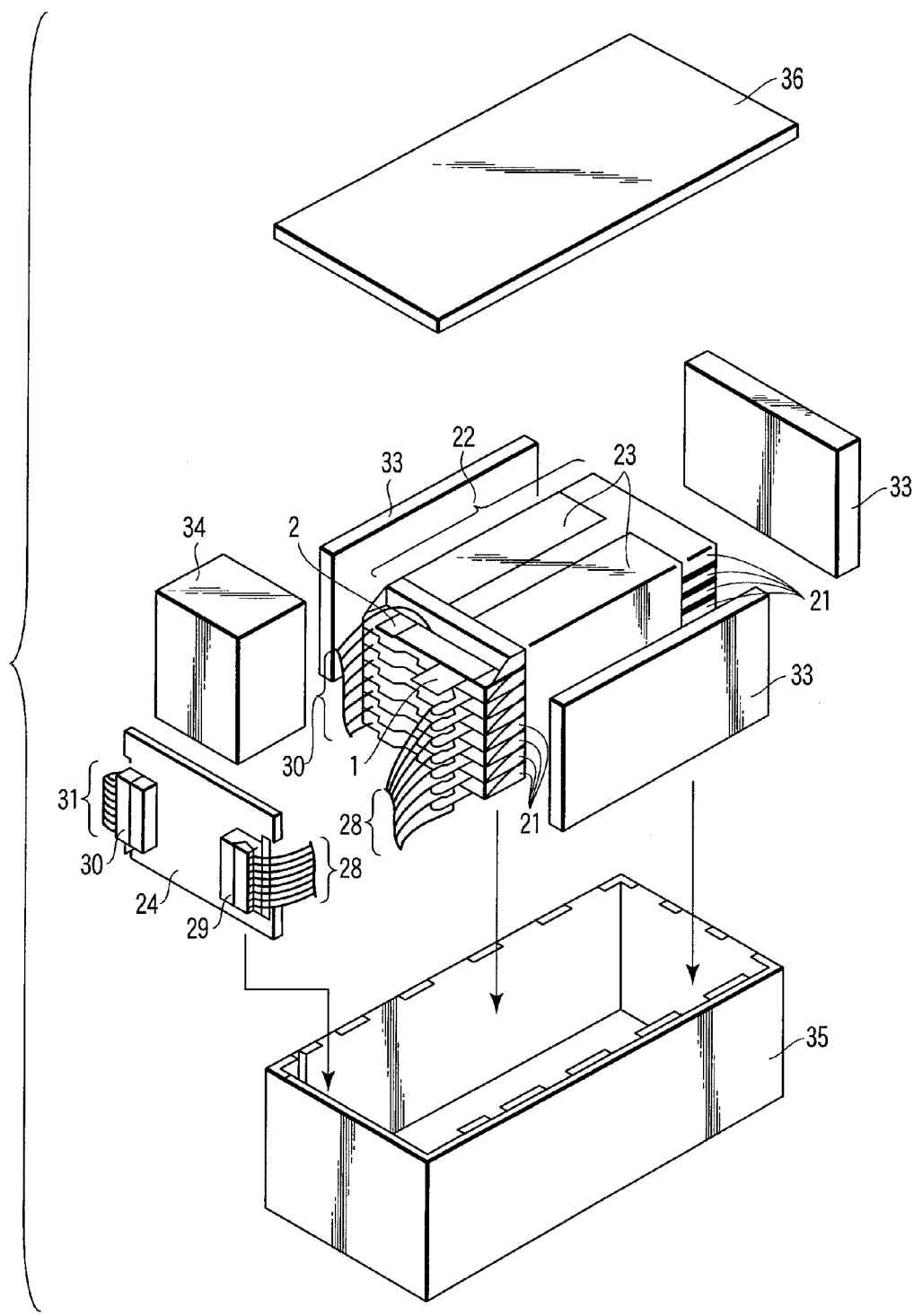
FIG. 6 is an exploded perspective view of a battery pack according to a second embodiment.

Each of a plurality of unit cells 21 included in the battery pack shown in FIG. 6 is formed of, though not limited to, a flattened type nonaqueous electrolyte battery constructed as shown in FIG. 1. The plural unit cells 21 are stacked one upon the other in the thickness direction in a manner to align the protruding directions of the positive electrode terminals 1 and the negative electrode terminals 2. As shown in FIG. 7, the unit cells 21 are connected in series to form a battery module 22. The unit cells 21 forming the battery module 22 are made integral by using an adhesive tape 23 as shown in FIG. 6.

A printed wiring board 24 is arranged on the side surface of the battery module 22 toward which protrude the positive electrode terminals 1 and the negative electrode terminals 2. As shown in FIG. 7, a thermistor 25, a protective circuit 26 and a terminal 27 for current supply to the external equipment are connected to the printed wiring board 24.

As shown in FIGS. 6 and 7, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium metal electrodes used as reference electrodes are inserted into the unit cells 21.

In the case of FIG. 7, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 6 and 7 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack of the second embodiment is preferably applied to uses where cycle performance under a large current is desired. Specific examples of the application of the battery pack include uses as power sources of digital cameras, and uses for vehicles such as two- to four-wheel hybrid electric cars, two- to four-wheel electric cars and power-assisted bicycles. The uses for vehicles are particularly preferable.

In the case where as the nonaqueous electrolyte, a mixture solvent obtained by mixing at least two or more of propylene carbonate (PC), ethylene carbonate (EC) and γ-butyrolactone (GBL) is used or γ-butyrolactone (GBL) is contained, uses for which high-temperature performance is desired are preferable. Specific examples of these uses include the aforementioned uses for vehicles.

Third Embodiment

A vehicle according to a third embodiment comprises the battery pack according to the second embodiment. Examples of the vehicle referred to here include two- to four-wheel hybrid electric cars, two- to four-wheel electric cars and power-assisted bicycles.

Figure 8:
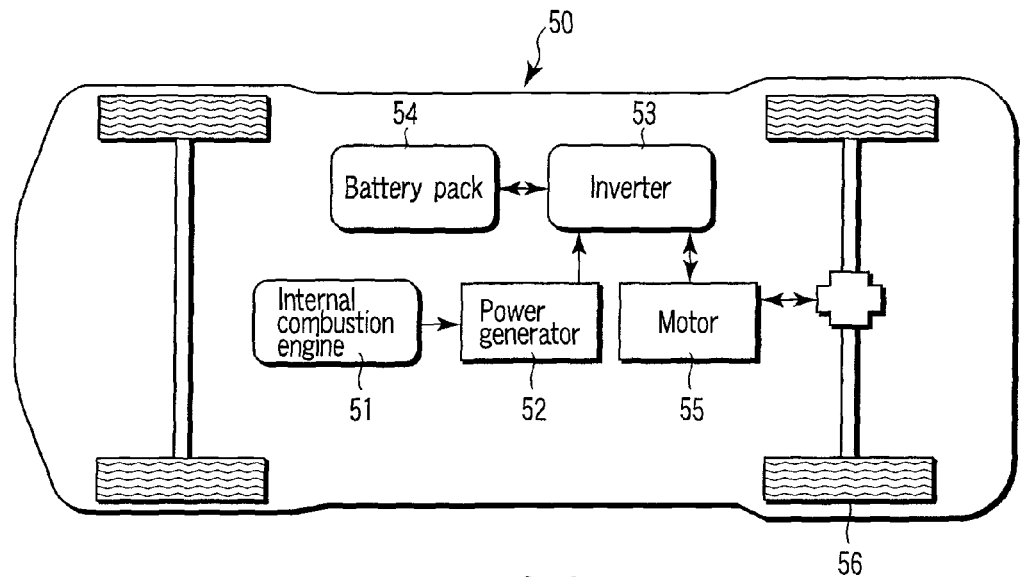
FIG. 8 is a typical view showing a series hybrid car according to a third embodiment.
Figure 9:
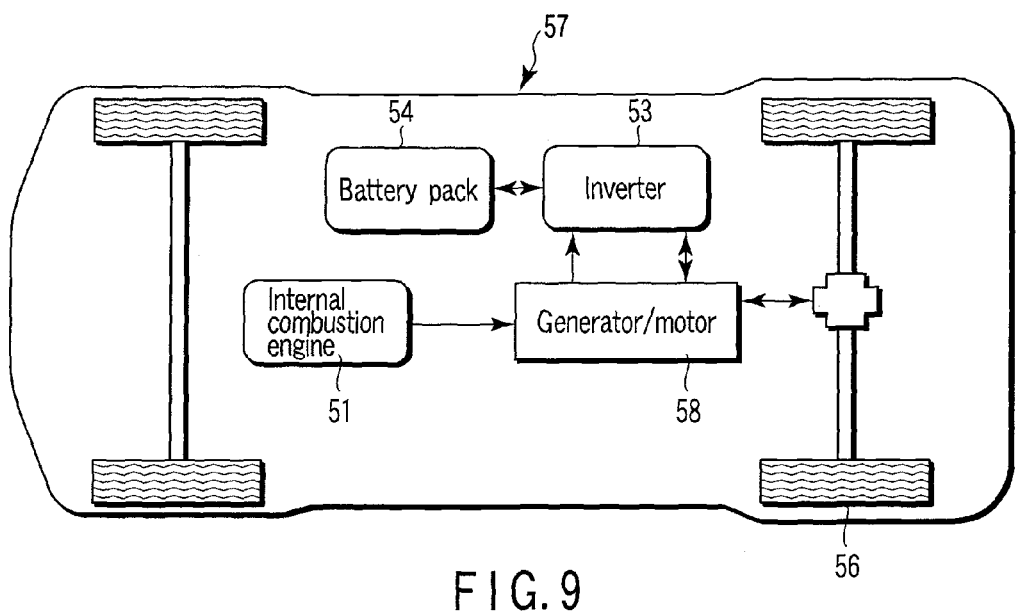
FIG. 9 is a typical view showing a parallel hybrid car according to the third embodiment.
Figure 10:
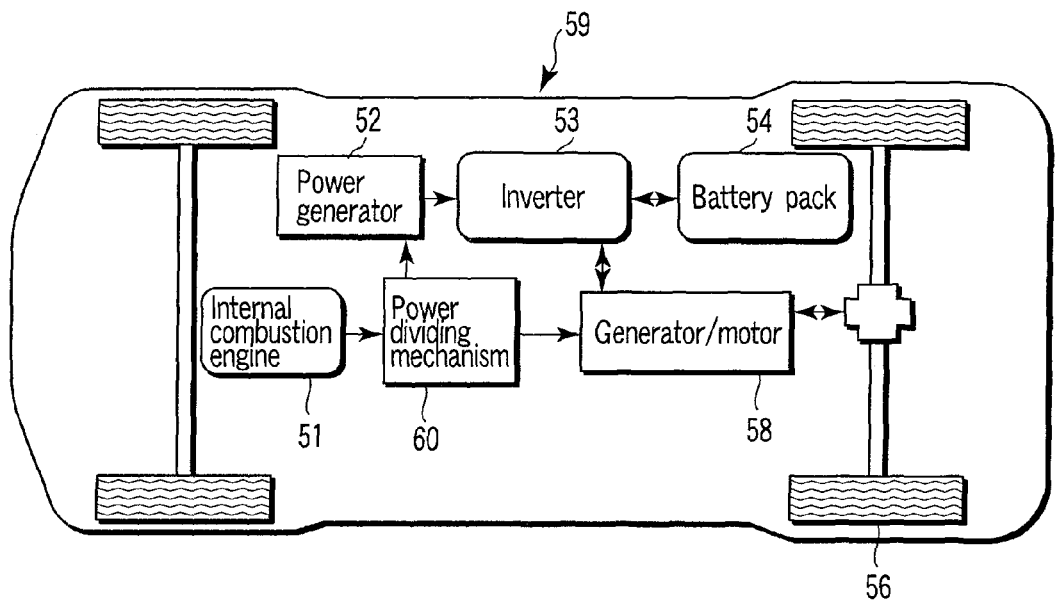
FIG. 10 is a typical view showing a series-parallel hybrid car according to the third embodiment.

FIGS. 8 to 10 show various type of hybrid vehicles in which an internal combustion engine and a motor driven by a battery pack are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by a high-efficiency electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 8 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 8 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above is the capacity at the time when the battery pack is discharged at a rate of 0.2 C.

FIG. 9 shows the construction of a hybrid vehicle 57 that is called a parallel hybrid vehicle. A reference numeral 58 shown in FIG. 9 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 9 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 3 to 10 Ah.

FIG. 10 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 3 to 10 Ah.

It is desirable for the nominal voltage of the battery pack included in the hybrid vehicles as shown in FIGS. 8 to 10 to fall within a range of 200 to 600V.

The battery pack according to embodiments of the present invention is adapted for use in the series-parallel hybrid vehicle.

Figure 11:
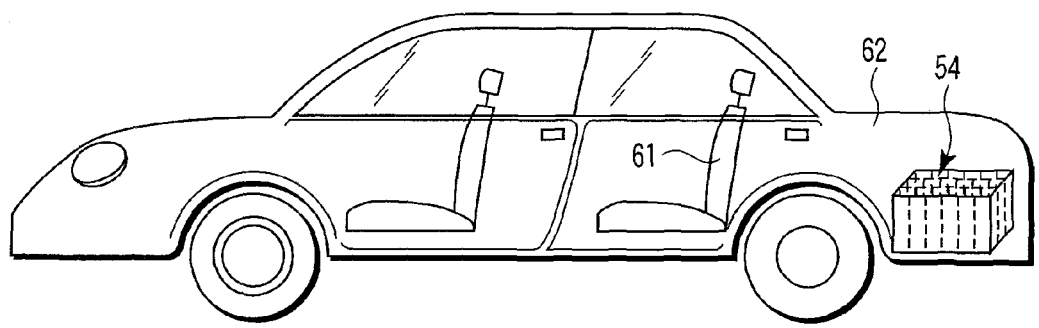
FIG. 11 is a typical view showing a car according to the third embodiment.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 11, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 12:
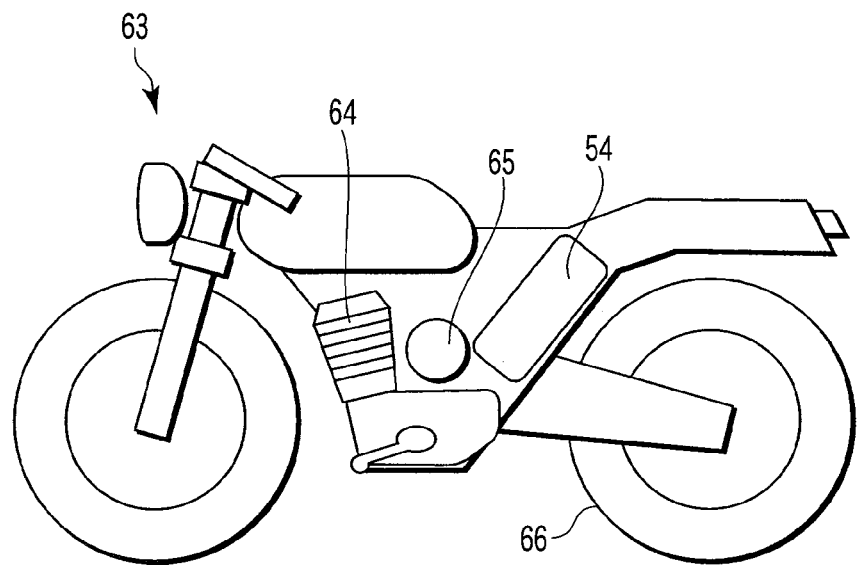
FIG. 12 is a typical view showing a hybrid motorcycle according to the third embodiment.

FIG. 12 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 13:
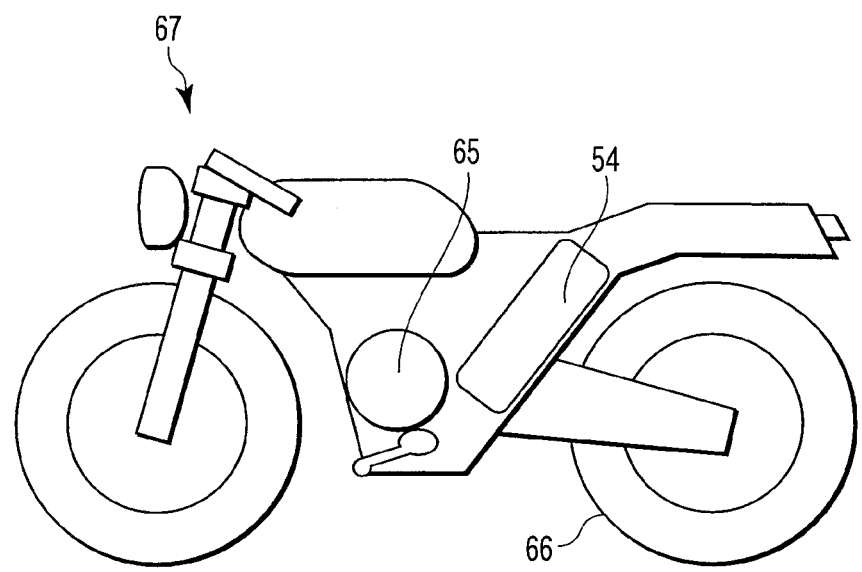
FIG. 13 is a typical view showing an electric motorcycle according to the third embodiment.

FIG. 13 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Fourth Embodiment

Figure 14:
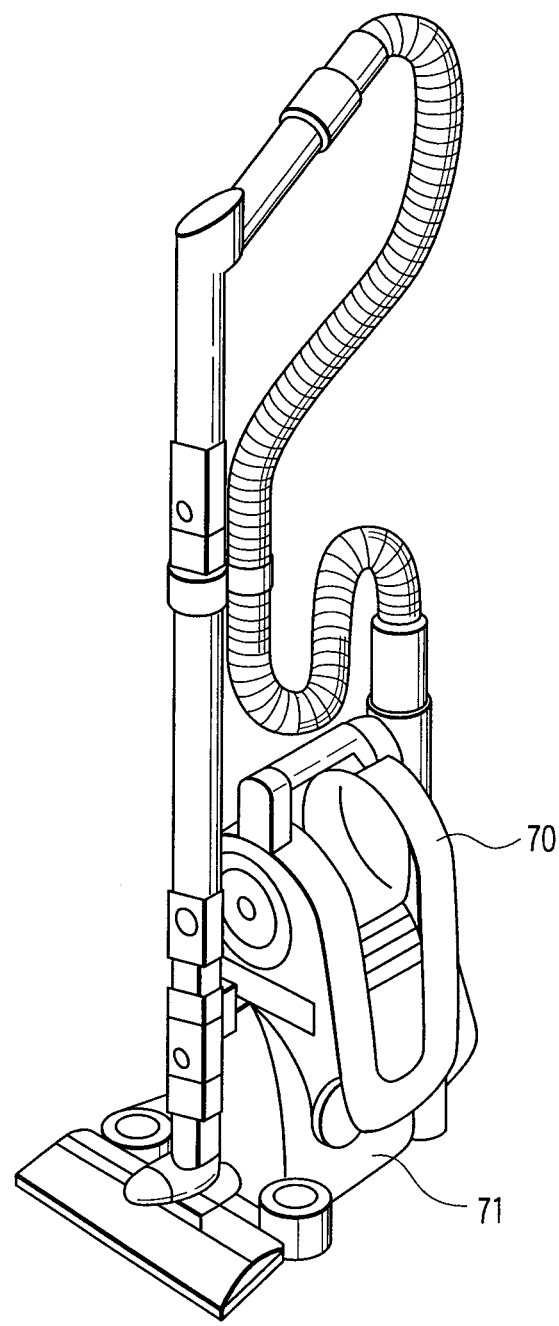
FIG. 14 is a typical view showing a chargeable vacuum cleaner according to a fourth embodiment.
Figure 15:
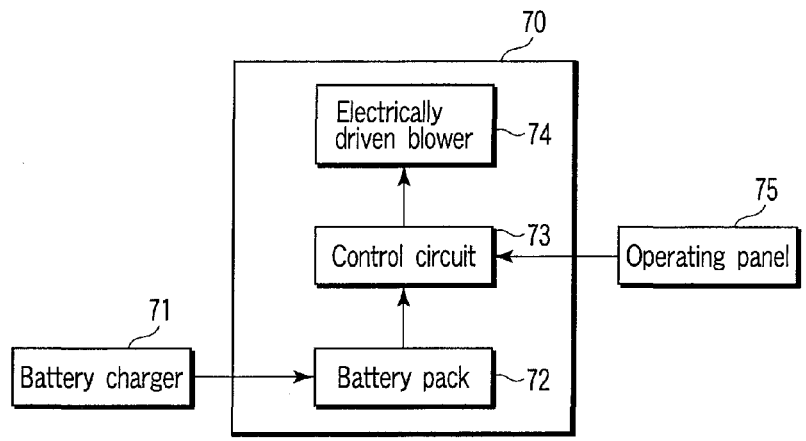
FIG. 15 is a structural view of the chargeable vacuum cleaner of FIG. 14.

FIGS. 14 and 15 show an example of a rechargeable vacuum cleaner according to a fourth embodiment. The rechargeable vacuum cleaner comprises an operating panel 75 which selects operation modes, an electrically driven blower 74 comprising a fun motor for generating suction power for dust collection, and a control circuit 73. A battery pack 72 according to the second embodiment as a power source for driving these units are housed in a casing 70. When the battery pack is housed in such a portable device, the battery pack is desirably fixed with interposition of a buffer material in order to prevent the battery pack from being affected by vibration. Known technologies may be applied for maintaining the battery pack at an appropriate temperature. While a battery charger 71 that also serves as a setting table functions as the battery charger of the battery pack according to the second embodiment, a part or all of the function of the battery charger may be housed in the casing 70.

While the rechargeable vacuum cleaner consumes a large electric power, the rated capacity of the battery pack is desirably in the range of 2 to 10 Ah, more preferably 2 to 4 Ah, in terms of portability and operation time. The nominal voltage of the battery pack is desirably in the range of 40 to 80V.

Examples will be explained below. However, the present invention is not limited to the examples described below as long as it is within the concepts of the present invention.

EXAMPLE 1

<Production of Positive Electrode>

First, 90% by weight of a lithium-cobalt oxide powder ($LiCoO_2$) as an active material, 3% by weight of acetylene black and 3% by weight of graphite as conductive agents and 4% by weight of polyvinylidene fluoride (PVdF) were added to N-methylpyrrolidone (NMP) and these components were mixed to make a slurry. This slurry was applied to both surfaces of a current collector made of a 15-μm-thick aluminum foil (purity: 99.3% and average crystal grain size: 10 μm) and dried, followed by pressing to produce a positive electrode having an electrode density of 3.3 g/cm³.

<Production of Negative Electrode>

Figure 16:
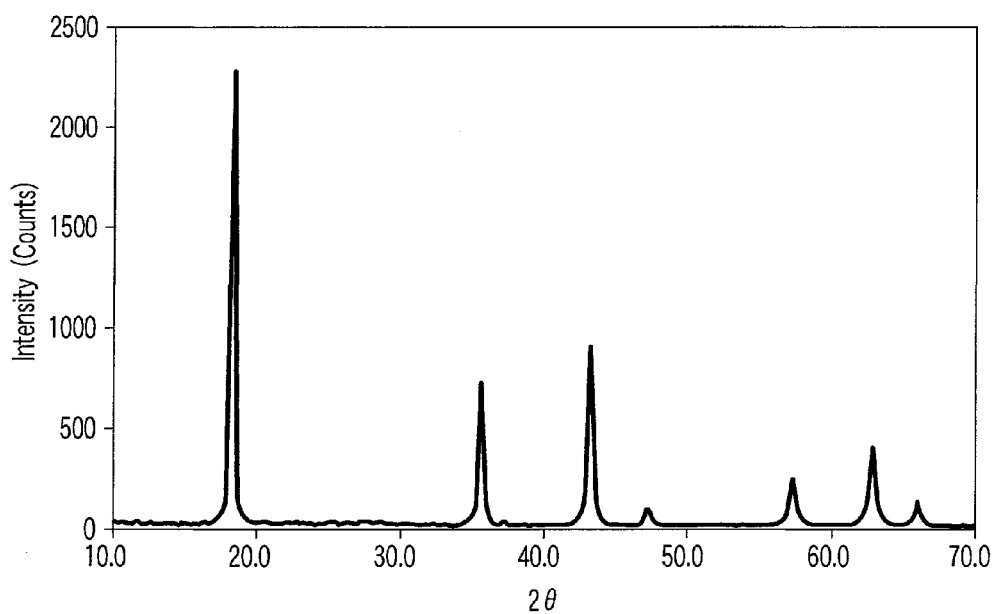
FIG. 16 is a characteristic view showing an X-ray diffraction pattern of lithium-titanium oxide used in a nonaqueous electrolyte battery of Example 1.

A powder of lithium titanate ($Li_4Ti_5O_{12}$) having a spinel structure, an average particle size of 0.82 μm, a BET specific surface area of 10.4 m²/g and a lithium ion insertion potential of 1.55V (vs. $Li/Li^+$) was prepared as an active material. The X-ray diffraction pattern of this spinel type lithium titanate is shown in FIG. 16.

The particle diameter of the negative electrode active material was measured by the following method.

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle diameter distribution data.

Also, the lithium ion insertion potential was measured by the method explained below.

The negative electrode was cut into small pieces each sized at 2 cm×2 cm to obtain working electrodes. The working electrode was arranged to face a counter electrode formed of a lithium metal foil sized at 2.2 cm×2.2 cm with a glass filter separator interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 25 mL of an electrolysis solution, which was prepared by dissolving $LiBF_4$ in a concentration of 1.5 mol/L in a mixed solvent prepared by mixing ethylene carbonate (EC) and γ-butyrolactone (GBL) in a mixing ratio by volume of 1:2, was poured into the glass cell such that the separator and the electrodes were sufficiently impregnated with the electrolysis solution, followed by hermetically closing the glass cell. The glass cell thus manufactured was arranged in a constant temperature bath maintained at 25° C. to measure the lithium ion insertion potential of the working electrode at the time when the glass cell was charged with a current density of 0.1 $mA/cm^2$.

N-methylpyrrolidone (NMP) was added to 90% by weight of an active material, 5% by weight of cokes ($d_{002}$: 0.3465 nm, average particle diameter: 8.2 μm and BET specific surface area: 11.2 $m^2/g$) baked at 1300° C. as a carbonaceous material containing-conductive agent and 5% by weight of polyvinylidene fluoride (PVdF) such that the ratio of a solid was 62%. The mixture was kneaded using a planetary mixer to gradually reduce the ratio of a solid while adding NMP, thereby preparing a slurry having a viscosity of 10.2 cp (B-type viscometer, a value at 50 rpm). This slurry was further mixed in a bead mill using zirconia balls having a diameter of 1 mm as the media.

The obtained slurry was applied to both surfaces of a current collector made of a 15-μm-thick aluminum foil (purity 99.3% and average crystal grain size: 10 μm) and dried, followed by pressing using a roll heated to 100° C. to obtain a negative electrode having an electrode density of 2.35 $g/cm^3$ and a porosity of 32.7%. The distribution of pore diameter of the negative electrode was measured by mercury porosity according to the method described below.

The distribution of pore diameter of the negative electrode was measured by mercury porosity. As the measuring device, a Shimadzu Autopore 9520 model was used. The negative electrode was cut into a size of about 25×25 $mm^2$, then folded to make a sample which was placed in a measuring cell and then measured in the condition of an initial pressure of 20 kPa which is correspond to about 3 psia and is a pressure corresponding to the pore diameter of about 60 μm. When the data was analyzed, the pore specific surface area was calculated on the premise that the shape of the pore is a cylindrical form. The pore diameter giving the highest frequency in the distribution of pore diameters was defined as the mode diameter of the negative electrode. The mode diameter was 0.093 μm in the case of Example 1. The pore diameter giving the highest frequency in a pore diameter range from 0.01 to 0.2 μm was defined as a mode diameter of a first peak. In the case of Example 1, the mode diameter of the first peak was 0.093 μm. The pore diameter giving the highest frequency in a pore diameter range from 0.003 to 0.02 μm was defined as a mode diameter of a second peak. In the case of Example 1, the mode diameter of the second peak was 0.0098 μm.

It should be noted that the analytical principle of the mercury porosimetry is based on Washburn's equation (2):

$$D=-4\gamma \cos \theta /P \qquad \text{Equation (2)}$$

Here, P is a pressure to be applied, D is a pore diameter, γ is the surface tension of mercury and is 480 dyne·$cm^{-1}$, and θ is a contact angle of mercury with the wall surface of pores and is 140°. γ and θ are constants and therefore, the relation between the applied pressure P and the pore diameter D is found from Washburn's equation. If mercury penetration volume at this time is measured, the pore diameter and its volumetric distribution can be found. As to the details of measuring method, principle and the like, please refer to, for example, Motoji Zimpo et al., "Microparticle Handbook" Asakura Shoten, (1991) and Sohachiro Hayakawa, "Powder Property Measuring Method", Asakura Shoten (1978).

In Example 1, the specific pore volume, which is the pore volume per g of the negative electrode excluding the current collector, was 0.2734 mL/g in the whole range. The specific pore volume in the range of 0.01 to 0.2 μm in the distribution of pore diameter was 0.1412 mL/g. The specific pore volume in the range of 0.003 to 0.02 μm in the distribution of pore diameter was 0.0005 mL/g. The specific surface area, which is the pore surface area per g of the negative electrode excluding the current collector, was 8.22 $m^2/g$ in the whole range. The specific surface area in the range of 0.01 to 0.2 μm in the distribution of pore diameter was 8.02 $m^2/g$. The specific surface area in the range of 0.003 to 0.02 μm in the distribution of pore diameter was 0.20 $m^2/g$.

<Production of Electrode Group>

The positive electrode, a separator made of a polyethylene porous film having a thickness of 25 μm, the negative electrode and the separator were laminated in this order and the laminate was then spirally wound. The coil was pressed under heating at 80° C. to manufacture a 30-mm-wide and 1.6-mm-thick flat electrode group. The obtained electrode group was received in a pack made of 0.1-mm-thick laminate film having a three-layer structure consisting of a nylon layer/aluminum layer/polyethylene layer and the pack was subjected to vacuum drying at 80° C. for 24 hours.

<Preparation of Liquid Nonaqueous Electrolyte>

2 mol/L of $LiBF_4$ was dissolved as an electrolyte in a mixture solvent prepared by mixing ethylene carbonate (EC) with γ-butyrolactone (GBL) in a ratio by volume of 1:2. 0.001 wt % of 1,3-propene sultone was added to the resulting solution to prepare a nonaqueous electrolyte. The viscosity of the above nonaqueous electrolyte at 20° C. was 7.1 cp (measured by B-type viscometer).

After the liquid nonaqueous electrolyte was poured into the laminate film pack in which the electrode group was received, the pack was perfectly sealed by heat sealing to produce a nonaqueous electrolyte secondary battery having the structure shown in FIG. 1 and a size of 35 mm (width)×2.0 mm (thickness)×65 mm (height).

EXAMPLES 2 TO 11

Comparative Example 1

Nonaqueous electrolyte secondary batteries were manufactured in the same manner as in Example 1 except that 1,3-propene sultone was used as the additive to the nonaqueous electrolyte in the amounts shown in Table 1.

EXAMPLES 12 TO 22

Nonaqueous electrolyte secondary batteries were manufactured in the same manner as in Example 1 except that 1,4-butene sultone was used in place of 1,3-propene sultone as the additive to the nonaqueous electrolyte in the amounts shown in Table 1.

EXAMPLES 23

A nonaqueous electrolyte secondary battery was manufactured in the same manner as in Example 1 except that 1,3-propene sultone and 1,4-butene sultone were used together as the additive to the nonaqueous electrolyte in the amounts shown in Table 2.

EXAMPLE 24

A nonaqueous electrolyte secondary battery was manufactured in the same manner as in Example 1 except that 1,3-propene sultone and 1,3-propane sultone were used together as the additive to the nonaqueous electrolyte in the amounts shown in Table 2.

EXAMPLE 25

A nonaqueous electrolyte secondary battery was manufactured in the same manner as in Example 1 except that 1,3-propene sultone and 1,4-butane sultone were used together as the additive to the nonaqueous electrolyte in the amounts shown in Table 2.

Comparative Example 2

A nonaqueous electrolyte secondary battery was manufactured in the same manner as in Example 1 except that 0.5 wt % of 1,3-propane sultone was used as the additive to the nonaqueous electrolyte.

EXAMPLE 26

A nonaqueous electrolyte secondary battery was manufactured in the same manner as in Example 5 except that the nonaqueous solvent was altered to a mixture solvent obtained by mixing ethylene carbonate (EC) with diethyl carbonate (DEC) in a ratio by volume of 1:2 and the electrolyte was altered to 1.5 mol/L of $LiPF_6$.

EXAMPLE 27

A nonaqueous electrolyte secondary battery was manufactured in the same manner as in Example 26 except that 1,4-butene sultone was used in place of 1,3-propene sultone as the additive to the nonaqueous electrolyte.

EXAMPLE 28

A nonaqueous electrolyte secondary battery was manufactured in the same manner as in Example 26 except that $TiO_2$ (lithium ion insertion potential: 1.8V (vs. $Li/Li^+$)) was used in place of $Li_4Ti_5O_{12}$ as the negative electrode active material.

Comparative Example 3

A nonaqueous electrolyte secondary battery was manufactured in the same manner as in Example 28 except that 1,3-propene sultone was not added to the nonaqueous electrolyte.

EXAMPLE 29

A nonaqueous electrolyte secondary battery was manufactured in the same manner as in Example 26 except that FeS (lithium ion insertion potential: 1.8V (vs. $Li/Li^+$)) was used in place of $Li_4Ti_5O_{12}$ as the negative electrode active material.

Comparative Example 4

A nonaqueous electrolyte secondary battery was manufactured in the same manner as in Example 29 except that 1,3-propene sultone was not added to the nonaqueous electrolyte.

Comparative Example 5

A nonaqueous electrolyte secondary battery was manufactured in the same manner as in Example 5 except that graphite particles (lithium ion insertion potential: 0.15V (vs. $Li/Li^+$)) having an average particle diameter of 6 μm were used as the negative electrode active material.

Comparative Example 6

A nonaqueous electrolyte secondary battery was manufactured in the same manner as in Comparative Example 5 except that 1,3-propene sultone was not added to the nonaqueous electrolyte.

EXAMPLE 30

A nonaqueous electrolyte secondary battery was manufactured in the same manner as in Example 5 except that the nonaqueous solvent was altered to a mixture solvent obtained by mixing ethylene carbonate (EC) with propylene carbonate (PC) in a ratio by volume of 1:1 and the electrolyte was altered to 1.5 mol/L of $LiBF_4$.

The obtained secondary battery was subjected to 1 C-low-rate discharge and 10 C-high-rate discharge to calculate the ratio of the 10 C-capacity to the 1 C-capacity. The ratio is given in Table 3. Also, a cycle test was carried out in which 5 C charge-5 C discharge was repeated under a circumstance of 45° C., to measure the number of cycles in which the capacity was 80% of the 5 C discharge capacity in the first cycle. The number of cycles was defined as a cycle life and the results are described together in Table 3.

Further, a variation in the thickness of the battery when the test was finished, which is the ratio of an increase in thickness to the initial battery thickness, was measured. The results are given in Table 3.

TABLE 1

| | Negative electrode active material | Solvent | Solute | First additive | Amount of first additive (wt %) | Second additive | Amount of second additive (wt %) |
|---|---|---|---|---|---|---|---|
| Example 1 | $Li_4Ti_5O_{12}$ | EC/GBL(1:2) | 2.0M $LiBF_4$ | 1,3-propene sultone | 0.001 | — | — |
| Example 2 | $Li_4Ti_5O_{12}$ | EC/GBL(1:2) | 2.0M $LiBF_4$ | 1,3-propene sultone | 0.01 | — | — |
| Example 3 | $Li_4Ti_5O_{12}$ | EC/GBL(1:2) | 2.0M $LiBF_4$ | 1,3-propene sultone | 0.1 | — | — |
| Example 4 | $Li_4Ti_5O_{12}$ | EC/GBL(1:2) | 2.0M $LiBF_4$ | 1,3-propene sultone | 0.2 | — | — |
| Example 5 | $Li_4Ti_5O_{12}$ | EC/GBL(1:2) | 2.0M $LiBF_4$ | 1,3-propene sultone | 0.5 | — | — |

TABLE 1-continued

| | Negative electrode active material | Solvent | Solute | First additive | Amount of first additive (wt %) | Second additive | Amount of second additive (wt %) |
|---|---|---|---|---|---|---|---|
| Example 6 | $Li_4Ti_5O_{12}$ | EC/GBL(1:2) | 2.0M $LiBF_4$ | 1,3-propene sultone | 1 | — | — |
| Example 7 | $Li_4Ti_5O_{12}$ | EC/GBL(1:2) | 2.0M $LiBF_4$ | 1,3-propene sultone | 2 | — | — |
| Example 8 | $Li_4Ti_5O_{12}$ | EC/GBL(1:2) | 2.0M $LiBF_4$ | 1,3-propene sultone | 5 | — | — |
| Example 9 | $Li_4Ti_5O_{12}$ | EC/GBL(1:2) | 2.0M $LiBF_4$ | 1,3-propene sultone | 10 | — | — |
| Comparative Example 1 | $Li_4Ti_5O_{12}$ | EC/GBL(1:2) | 2.0M $LiBF_4$ | — | — | — | — |
| Example 10 | $Li_4Ti_5O_{12}$ | EC/GBL(1:2) | 2.0M $LiBF_4$ | 1,3-propene sultone | 0.0005 | — | — |
| Example 11 | $Li_4Ti_5O_{12}$ | EC/GBL(1:2) | 2.0M $LiBF_4$ | 1,3-propene sultone | 15 | — | — |
| Example 12 | $Li_4Ti_5O_{12}$ | EC/GBL(1:2) | 2.0M $LiBF_4$ | 1,4-butene sultone | 0.001 | — | — |
| Example 13 | $Li_4Ti_5O_{12}$ | EC/GBL(1:2) | 2.0M $LiBF_4$ | 1,4-butene sultone | 0.01 | — | — |
| Example 14 | $Li_4Ti_5O_{12}$ | EC/GBL(1:2) | 2.0M $LiBF_4$ | 1,4-butene sultone | 0.1 | — | — |
| Example 15 | $Li_4Ti_5O_{12}$ | EC/GBL(1:2) | 2.0M $LiBF_4$ | 1,4-butene sultone | 0.2 | — | — |
| Example 16 | $Li_4Ti_5O_{12}$ | EC/GBL(1:2) | 2.0M $LiBF_4$ | 1,4-butene sultone | 0.5 | — | — |
| Example 17 | $Li_4Ti_5O_{12}$ | EC/GBL(1:2) | 2.0M $LiBF_4$ | 1,4-butene sultone | 1 | — | — |
| Example 18 | $Li_4Ti_5O_{12}$ | EC/GBL(1:2) | 2.0M $LiBF_4$ | 1,4-butene sultone | 2 | — | — |
| Example 19 | $Li_4Ti_5O_{12}$ | EC/GBL(1:2) | 2.0M $LiBF_4$ | 1,4-butene sultone | 5 | — | — |
| Example 20 | $Li_4Ti_5O_{12}$ | EC/GBL(1:2) | 2.0M $LiBF_4$ | 1,4-butene sultone | 10 | — | — |
| Example 21 | $Li_4Ti_5O_{12}$ | EC/GBL(1:2) | 2.0M $LiBF_4$ | 1,4-butene sultone | 0.0005 | — | — |
| Example 22 | $Li_4Ti_5O_{12}$ | EC/GBL(1:2) | 2.0M $LiBF_4$ | 1,4-butene sultone | 15 | — | — |

TABLE 2

| | Negative electrode active material | Solvent | Solute | First additive | Amount of first additive (wt %) | Second additive | Amount of second additive (wt %) |
|---|---|---|---|---|---|---|---|
| Example 23 | $Li_4Ti_5O_{12}$ | EC/GBL(1:2) | 2.0M $LiBF_4$ | 1,3-propene sultone | 0.25 | 1,4-butene sultone | 0.25 |
| Example 24 | $Li_4Ti_5O_{12}$ | EC/GBL(1:2) | 2.0M $LiBF_4$ | 1,3-propene sultone | 0.25 | 1,3-propane sultone | 0.25 |
| Example 25 | $Li_4Ti_5O_{12}$ | EC/GBL(1:2) | 2.0M $LiBF_4$ | 1,3-propene sultone | 0.25 | 1,4-butane sultone | 0.25 |
| Comparative Example 2 | $Li_4Ti_5O_{12}$ | EC/GBL(1:2) | 2.0M $LiBF_4$ | 1,3-propane sultone | 0.5 | | |
| Example 26 | $Li_4Ti_5O_{12}$ | EC/DEC(1:2) | 1.5M $LiPF_6$ | 1,3-propene sultone | 0.5 | — | — |
| Example 27 | $Li_4Ti_5O_{12}$ | EC/DEC(1:2) | 1.5M $LiPF_6$ | 1,4-butene sultone | 0.5 | — | — |
| Example 28 | $TiO_2$ | EC/DEC(1:2) | 2.0M $LiBF_4$ | 1,3-propene sultone | 0.5 | — | — |
| Comparative Example 3 | $TiO_2$ | EC/DEC(1:2) | 2.0M $LiBF_4$ | — | — | — | — |
| Example 29 | FeS | EC/DEC(1:2) | 1.5M $LiPF_6$ | 1,3-propene sultone | 0.5 | | |
| Comparative Example 4 | FeS | EC/DEC(1:2) | 1.5M $LiPF_6$ | — | — | | |
| Comparative Example 5 | Graphite | EC/GBL(1:2) | 2.0M $LiBF_4$ | 1,3-propene sultone | 0.5 | — | — |
| Comparative Example 6 | Graphite | EC/GBL(1:2) | 2.0M $LiBF_4$ | — | — | — | — |
| Example 30 | $Li_4Ti_5O_{12}$ | EC/PC(1:1) | 1.5M $LiBF_4$ | 1,3-propene sultone | 0.5 | — | — |

TABLE 3

| | 10 C capacity/1 C capacity ratio (%) | Cycle life (cycles) | Battery swell (%) |
|---|---|---|---|
| Example 1 | 87 | 3000 | <1 |
| Example 2 | 87 | 3300 | <1 |
| Example 3 | 87 | 3500 | <1 |
| Example 4 | 87 | 4000 | <1 |
| Example 5 | 87 | 4000 | <1 |
| Example 6 | 87 | 4000 | <1 |
| Example 7 | 85 | 3800 | <1 |
| Example 8 | 83 | 3000 | <1 |
| Example 9 | 80 | 3000 | <1 |
| Comparative Example 1 | 90 | 800 | >100 |
| Example 10 | 88 | 1800 | 5 |
| Example 11 | 70 | 2000 | 10 |
| Example 12 | 86 | 3000 | <1 |
| Example 13 | 86 | 3200 | <1 |
| Example 14 | 86 | 3400 | <1 |
| Example 15 | 86 | 3500 | <1 |
| Example 16 | 86 | 3400 | <1 |
| Example 17 | 86 | 3400 | <1 |
| Example 18 | 84 | 3100 | <1 |
| Example 19 | 82 | 3000 | <1 |
| Example 20 | 80 | 3000 | <1 |
| Example 21 | 88 | 1600 | 5 |
| Example 22 | 70 | 1800 | 15 |
| Example 23 | 87 | 3800 | <1 |
| Example 24 | 87 | 4200 | <1 |
| Example 25 | 87 | 5000 | <1 |
| Comparative Example 2 | 64 | 700 | 50 |
| Example 26 | 85 | 3600 | <1 |
| Example 27 | 85 | 3300 | <1 |
| Example 28 | 78 | 600 | <1 |
| Comparative Example 3 | 80 | 200 | >100 |
| Example 29 | 84 | 800 | <1 |
| Comparative Example 4 | 88 | 200 | >100 |
| Comparative Example 5 | 60 | 450 | <1 |

TABLE 3-continued

| | 10 C capacity/1 C capacity ratio (%) | Cycle life (cycles) | Battery swell (%) |
|---|---|---|---|
| Comparative Example 6 | 80 | 400 | <1 |
| Example 30 | 86 | 4000 | <1 |

The batteries of Examples 1 to 30 are each more reduced in the swelling of a battery due to the generation of gas after the cycle test at 45° C. than the batteries of Comparative Examples 1 to 4. Also, the batteries of Examples 1 to 29 each have a longer cycle life at 45° C. than the batteries of Comparative Examples 5 and 6. Therefore, the nonaqueous electrolyte secondary battery comprising the nonaqueous electrolyte containing the first sultones according to this embodiment is expected to have a long cycle life under a high-temperature circumstance of 45° C. or more.

Also, the batteries of Examples 24 and 25 each have a higher capacity-maintenance rate in 10 C high-rate discharge and a longer cycle life than the battery of Comparative Example 2. Specifically, the nonaqueous electrolyte secondary battery of Comparative Example 2 in which the second sultones were independently added has a high resistance and a short life. On the other hand, the nonaqueous electrolyte batteries of Examples 24 and 25 in which the first sultones and second sultones are intermingled are each excellent in large-current performance and have a long life. This is because the first sultones more reducible than the second sultones form a high-quality and stable film in the initial stage of the first charge to prevent excessive decomposition of the second sultones afterward.

It is understood from Examples 26, 27 and 30 that the battery functions even if diethyl carbonate or propylene carbonate is contained in the nonaqueous solvent.

As is clarified from the comparisons between Example 28 and Comparative Example 3 and between Example 29 and Comparative Example 4, an improvement in cycle performance and restriction on the swelling of a battery are attained even if $TiO_2$ or FeS is used as the negative electrode active material.

It is understood from the comparison among Examples 1 to 11 that Examples 1 to 9 in which the amount of 1,3-propene sultone to be added is 0.001% by weight or more to 10% by weight or less are superior in cycle life and in the swelling of a battery to Examples 10 and 11 in which the amount of 1,3-propene sultone to be added is out of the above range. Also, when the amount of 1,3-propene sultone to be added was designed to be 0.01% by weight or more and 2% by weight or less, a particularly high cycle life was obtained. In Examples 12 to 22 using 1,4-butene sultone in place of 1,3-propene sultone, the same tendency was also obtained.

However, when graphite is used as the negative electrode active material, as shown in Comparative Examples 5 and 6, the value of the 10 C-high-rate discharge is made extremely low by addition of the first sultones. This is because the first sultones excessively react on the surface of the carbonaceous material. It is therefore understood that in the case of using a carbonaceous material as the negative electrode active material, the battery functions ineffectively.

After the test, the battery of Example 5 and the batteries of Comparative Examples 1 and 2 were dismantled to carry out XPS analysis of the surface of the negative electrode. The results are shown in FIGS. 17 and 18.

The peak of C═C in FIG. 17 is one derived from graphite particles utilized as the negative electrode conductive agent. It is understood that the intensity of the peak is more reduced in Example 5 in which 1,3-propene sultone is added than in Comparative Example 1 in which no additive is added and Comparative Example 2 in which 1,3-propane sultone is added. This is because a thick film is selectively formed on the surface of graphite when 1,3-propene sultone is added. As a result, no gas is generated under a high-temperature condition and long cycle life is therefore attained.

The peak of the metal oxide in FIG. 18 is one derived from lithium titanate used as the negative electrode active material. The intensity of the peak is more increased in Example 5 in which 1,3-propene sultone is added than in Comparative Examples 1 in which no additive is added and Comparative Example 2 in which 1,3-propane sultone is added. It may be inferred that this is because the growth of a film on the surface of lithium titanate is scarcely caused when 1,3-propene sultone is added, and as a result, a battery which is excellent in large-current performance and has a long life is obtained.

Figure 19:
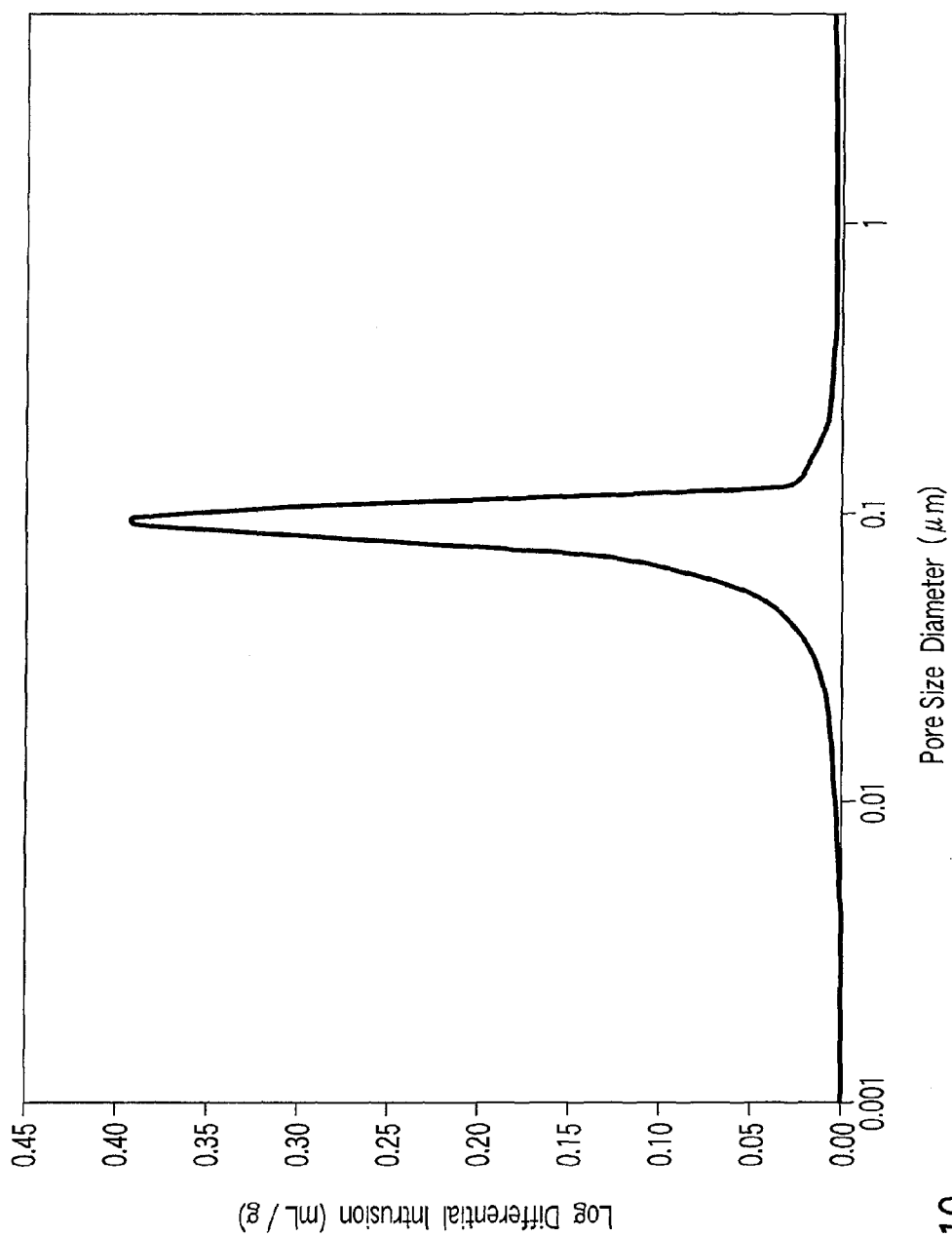
FIG. 19 is a characteristic view showing the distribution of pore diameter of a negative electrode of Example 5 when the pore diameter is measured by mercury porosimetry.

FIGS. 19 and 20 show the pore distribution of the negative electrode of Example 5 which is measured by mercury porosimetry. FIG. 19 shows the distribution of pore diameter. It is understood from FIG. 19 that there is the mode diameter of the first peak at 0.093 μm. Also, FIG. 20 is a view obtained by enlarging the distribution in the vicinity of 0.01 μm in the distribution of pore diameter shown in FIG. 19. It is understood from FIG. 20 that the mode diameter of the second peak is at 0.0098 μm. The ordinate in each graph of FIGS. 19 and 20 is the pore volume (mL) per g of the negative electrode including the current collector.

Comparative Example 7

A nonaqueous electrolyte battery was produced in the same manner as in Example 5 except that a lithium titanate ($Li_4Ti_5O_{12}$) powder having a spinel structure, an average particle diameter of 5.84 μM, a BET specific surface area of 2.1 m$^2$/g and a lithium ion insertion potential of 1.55V (vs. Li/Li+) was used as the negative electrode active material, and the density of the negative electrode, the porosity of the negative electrode, the specific volume of pores, the specific surface area of pores and the mode diameter were altered as shown in Tables 4 and 5 below.

EXAMPLE 31

A nonaqueous electrolyte battery was produced in the same manner as in Example 5 except that a lithium titanate ($Li_4Ti_5O_{12}$) powder having a spinel structure, an average particle diameter of 0.98 μm, a BET specific surface area of 6.1 m$^2$/g and a lithium ion insertion potential of 1.55V (vs. Li/Li$^+$) was used as the negative electrode active material, and the density of the negative electrode, the porosity of the negative electrode, the specific volume of pores, the specific surface area of pores and the mode diameter were altered as shown in Tables 4 and 5 below.

EXAMPLE 32

A nonaqueous electrolyte battery was produced in the same manner as in Example 5 except that a lithium titanate ($Li_4Ti_5O_{12}$) powder having a spinel structure, an average particle diameter of 0.62 μm, a BET specific surface area of 21.6 m$^2$/g and a lithium ion insertion potential of 1.55V (vs. Li/Li$^+$) was used as the negative electrode active material, and the density of the negative electrode, the porosity of the negative electrode, the specific volume of pores, the specific surface area of pores and the mode diameter were altered as shown in Tables 4 and 5 below.

EXAMPLE 33

A nonaqueous electrolyte battery was produced in the same manner as in Example 5 except that a lithium titanate ($Li_4Ti_5O_{12}$) powder having a spinel structure, an average particle diameter of 0.41 μm, a BET specific surface area of 35.2 m$^2$/g and a lithium ion insertion potential of 1.55V (vs. Li/Li$^+$) was used as the negative electrode active material, and the density of the negative electrode, the porosity of the negative electrode, the specific volume of pores, the specific surface area of pores and the mode diameter were altered as shown in Tables 4 and 5 below.

Comparative Example 8

A nonaqueous electrolyte battery was produced in the same manner as in Example 5 except that a lithium titanate ($Li_4Ti_5O_{12}$) powder having a spinel structure, an average particle diameter of 0.02 μm, a BET specific surface area of 70.4 m$^2$/g and a lithium ion insertion potential of 1.55V (vs. Li/Li$^+$) was used as the negative electrode active material, and the density of the negative electrode, the porosity of the negative electrode, the specific volume of pores, the specific surface area of pores and the mode diameter were altered as shown in Tables 4 and 5 below.

EXAMPLES 34 TO 37

Nonaqueous electrolyte batteries were each produced in the same manner as in Example 5 except that a lithium titanate ($Li_4Ti_5O_{12}$) powder having a spinel structure, the average grain size and BET specific surface area shown in Table 4 below and a lithium ion insertion potential of 1.55V (vs. Li/Li$^+$) was used as the negative electrode active material, and the density of the negative electrode, the porosity of the negative electrode, the specific volume of pores, the specific surface area of pores and the mode diameter were altered as shown in Tables 4 and 5 below.

Example 5, Examples 31 to 37 and Comparative Examples 7 and 8 were subjected to a 1 C-low-rate discharge and 20 C-high-rate discharge to calculate the ratio of the 20 C-capacity to the 1 C-capacity. The ratios are given in Table 5. Also, a cycle test was carried out in which 10 C charge-10 C discharge was repeated under a circumstance of 45° C., to measure the number of cycles in which the capacity was 80% of the 10 C discharge capacity in the first cycle. The number of cycles was defined as a cycle life, and the results are described together in Table 5.

TABLE 4

| | Negative electrode active material | Average particle diameter of negative electrode active material (μm) | Specific surface area of negative electrode active material (m$^2$/g) | Density of negative electrode (g/cm$^3$) | Specific pore volume of negative electrode (mL/g) | Specific Surface area of pores of negative electrode (m$^2$/g) | Mode diameter of negative electrode (μm) | Porosity of negative electrode (%) | Number of peaks |
|---|---|---|---|---|---|---|---|---|---|
| Comparative Example 7 | Li$_4$Ti$_5$O$_{12}$ | 5.84 | 2.1 | 2.2 | 0.0972 | 2.08 | 0.265 | 25.6 | 1 |
| Example 31 | Li$_4$Ti$_5$O$_{12}$ | 0.98 | 6.1 | 2.4 | 0.1474 | 6.12 | 0.155 | 32.1 | 2 |
| Example 5 | Li$_4$Ti$_5$O$_{12}$ | 0.82 | 10.4 | 2.35 | 0.2734 | 8.22 | 0.093 | 32.7 | 2 |
| Example 32 | Li$_4$Ti$_5$O$_{12}$ | 0.62 | 21.6 | 2.3 | 0.3374 | 16.87 | 0.050 | 37.4 | 2 |
| Example 33 | Li$_4$Ti$_5$O$_{12}$ | 0.41 | 35.2 | 2.2 | 0.3921 | 26.84 | 0.018 | 39.6 | 2 |
| Comparative Example 8 | Li$_4$Ti$_5$O$_{12}$ | 0.02 | 70.4 | 1.6 | 1.2211 | 60.12 | 0.009 | 44.0 | 1 |
| Example 34 | Li$_4$Ti$_5$O$_{12}$ | 0.98 | 6.1 | 2.5 | 0.1381 | 5.0 | 0.198 | 30.0 | 2 |
| Example 35 | Li$_4$Ti$_5$O$_{12}$ | 0.33 | 49.8 | 2.0 | 0.8464 | 39.8 | 0.155 | 41.9 | 2 |
| Example 36 | Li$_4$Ti$_5$O$_{12}$ | 0.98 | 6.1 | 2.45 | 0.1423 | 5.61 | 0.173 | 31.0 | 2 |
| Example 37 | Li$_4$Ti$_5$O$_{12}$ | 0.41 | 40.8 | 2.1 | 0.4287 | 30.16 | 0.015 | 40.5 | 2 |

TABLE 5

| | Pore volume of negative electrode [0.01-0.2 μm] (mL/g) | Specific Surface area of pores of negative electrode [0.01-0.2 μm] (m$^2$/g) | Mode diameter of negative electrode [0.01-0.2 μm] (μm) | Specific pore volume of negative electrode [0.003-0.02 μm] (mL/g) | Specific Surface area of pores of negative electrode [0.003-0.02 μm] (m$^2$/g) | Mode diameter of negative electrode [0.003-0.02 μm] (μm) | 20C capacity/ 1C capacity ratio (%) | Cycle life (cycles) |
|---|---|---|---|---|---|---|---|---|
| Comparative Example 7 | 0.0803 | 2.01 | 0.265 | — | — | — | 25 | 3200 |
| Example 31 | 0.1012 | 6.04 | 0.155 | 0.0001 | 0.10 | 0.0081 | 74 | 4000 |
| Example 5 | 0.1412 | 8.02 | 0.093 | 0.0005 | 0.20 | 0.0098 | 77 | >5000 |
| Example 32 | 0.1650 | 15.93 | 0.051 | 0.0021 | 0.91 | 0.0100 | 80 | >5000 |
| Example 33 | 0.1803 | 25.46 | 0.020 | 0.0084 | 1.22 | 0.0100 | 84 | >5000 |
| Comparative Example 8 | — | — | — | — | — | — | 56 | 2000 |
| Example 34 | 0.0510 | 5.08 | 0.198 | 0.0001 | 0.10 | 0.0050 | 72 | 4000 |
| Example 35 | 0.5000 | 29.4 | 0.156 | 0.0200 | 10.0 | 0.0150 | 82 | 4500 |
| Example 36 | 0.0984 | 5.84 | 0.132 | 0.0001 | 0.09 | 0.0050 | 72 | 4000 |
| Example 37 | 0.1873 | 28.53 | 0.017 | 0.0100 | 2.00 | 0.0150 | 85 | >5000 |

The batteries of Example 5 and Examples 30 to 37 each have a higher capacity-maintenance rate in 20 C high-rate discharge and a longer cycle life than the batteries of Comparative Examples 7 and 8. It was inferred that the batteries of Examples 5 and 30 to 37 respectively exhibited excellent performance because a film made of decomposed products of the first sultones were formed uniformly on macropores of the negative electrode, whereby the resistance of the negative electrode was reduced. It was also inferred that with regard to the battery of Comparative Example 7, not only was the initial resistance of the negative electrode high but also an increase in the resistance of the negative electrode in the charge-discharge cycle was large, leading to reductions in high-rate discharge maintenance rate and in cycle life. It was also inferred that with regard to Comparative Example 8, the pore diameter was too small and a film made of decomposable components were perfectly filled in pores, with the result that the resistance of the negative electrode was raised, so that the high-rate discharge-maintenance rate was reduced. Also, the battery of Comparative Example 8 was overhauled and as a result, it was confirmed that the nonaqueous electrolyte in the positive electrode had dried up. It was considered that an excessively large surface area of the negative electrode, as compared with the surface area of the positive electrode, had caused the nonaqueous electrolyte on the positive electrode to dry up, decreasing the cycle life.

As to the specific pore volume when the diameter measured by mercury porosimetry was 0.003 µm or more and 0.02 µm or less, Examples 5, 32, 33 and 37 having a specific pore volume of 0.0005 mL/g or more and 0.01 mL/g or less were superior in cycle performance to Examples 31, 34 and 36 having a specific pore volume of 0.0001 mL/g and Example 35 having a specific pore volume of 0.02 mL/g.

As to the specific pore surface area when the diameter measured by mercury porosimetry was 0.003 µm or more and 0.02 µm or less, Examples 5, 32, 33 and 37 having a specific pore surface area of 0.2 $m^2$/g or more and 2 $m^2$/g or less were superior in cycle performance to Examples 31, 34 and 36 having a specific pore surface area less than 0.2 $m^2$/g and Example 35 having a specific pore surface area exceeding 2 $m^2$/g.

(Method of Detecting PRS)

With regard to a secondary battery manufactured in the same manner as in Example 5, the potential was sufficiently stabilized by opening the circuit for 5 hours or more, it was decomposed in a glove box at Ar concentration of 99.9% or more and dew point of −50° C. or less, and the electrode group was taken out. The electrode group was put into a centrifugal settling tube, and dimethyl sulfoxide (DMSO)-$d_6$ was added to seal, and it was taken out from the glove box, and separated centrifugally. Thereafter, in the glove box, a mixed solution of the nonaqueous electrolyte and DMSO-$d_6$ was sampled from the centrifugal settling tube. The mixed solution was poured into an NMR test tube of 5 mm in diameter by about 0.5 ml, and the NMR measurement was carried out. An apparatus used in the NMR measurement was model JNM-LA400WB of JEOL Ltd., the observation nucleus was $^1$H, the observation frequency was 400 MHz, and the residual proton signal contained in a small amount in the dimethyl sulfoxide (DMSO)-$d_6$ was used as internal standard (2.5 ppm). The measuring temperature was 25° C. In the $^1$H NMR spectrum, the peak corresponding to EC was observed around 4.5 ppm. On the other hand, the peak corresponding to PRS was observed around 5.1 ppm, around 7.05 ppm, and around 7.2 ppm. It was confirmed from these results that PRS were contained in the nonaqueous solvent in the secondary battery.

Further, when at the observation frequency of 100 MHz, $^{13}$C NMR was measured by using dimethyl sulfoxide (DMSO)-$d_6$ (39.5 ppm) as an internal standard substance, the peak corresponding to EC was observed around 66 ppm and the peak corresponding to PRS around 74 ppm, around 124 ppm, and around 140 ppm. It was also confirmed from these results that PRS were contained in the nonaqueous solvent in the secondary battery.

Moreover, in the $^1$H NMR spectrum, the ratio of NMR integral intensity of PRS to the NMR integral intensity of EC were determined, and it was confirmed that the PRS rate in the nonaqueous solvent were decreased from before assembly of the secondary battery.

When the distribution of pores of the negative electrode incorporated into the nonaqueous electrolyte battery is measured by mercury porosimetry, the nonaqueous electrolyte battery is overhauled to take out the negative electrode, the negative electrode is washed with methylethyl carbonate to remove the nonaqueous electrolyte and then, the adhered methylethyl carbonate is vaporized under a reduced pressure condition. The negative electrode obtained in this manner is then subjected to measurement of the distribution of pores by mercury porosimetry in the same manner as explained in the aforementioned Example 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
   at least one positive electrode;
   at least one porous negative electrode comprising:
      an active material selected from the group consisting of a metal oxide, a metal sulfide, a metal nitride, and an alloy, which has a lithium ion insertion potential of 0.4V (vs Li/Li+) or more,
      a conductive agent comprising a carbonaceous material, and
      a current collector supporting the active material and the conductive agent; and
   a nonaqueous electrolyte comprising at least one first sultone having an unsaturated hydrocarbon group,
   wherein, upon measuring a distribution of the diameter of the pores within the porous negative electrode by mercury porosimetry, said distribution exhibits a first peak having a mode diameter of 0.01 to 0.2 µm and a second peak having a mode diameter of 0.003 to 0.02 µm, and
   upon measuring a first volume of pores having a diameter of 0.01 to 0.2 µm and a second volume of pores having a diameter of 0.003 to 0.02 µm by mercury porosimetery, said first volume is from 0.05 to 0.5 mL per gram of porous negative electrode excluding the current collector and said second volume is from 0.0001 to 0.02 mL per gram of the porous negative electrode excluding the current collector.

2. The battery according to claim 1, wherein the at least one first sultone is 1,3-propene sultone, 1,4-butene sultone, or a combination thereof.

3. The battery according to claim 1, wherein a content of the at least one first sultone in the nonaqueous electrolyte is 0.001 to 10% by weight.

4. The battery according to claim 1, wherein the nonaqueous electrolyte further comprises at least one second sultone having a saturated hydrocarbon group.

5. The battery according to claim 4, wherein the at least one second sultone is 1,3-propane sultone, 1,4-butane sultone or a combination thereof.

6. The battery according to claim 4, wherein a content of the at least one second sultone in the nonaqueous electrolyte is 0.001 to 10% by weight.

7. The battery according to claim 1, wherein a volume of pores having a diameter of 0.003 to 0.02 μm, which is measured by the mercury porosimetery, is 0.0005 to 0.01 mL per gram of the at least one porous negative electrode excluding the current collector.

8. The battery according to claim 1, wherein the mode diameter of the second peak is 0.005 to 0.015 μm.

9. The battery according to claim 1, wherein a surface area of pores having a diameter of 0.003 to 0.02 μm, which is measured by the mercury porosimetery, is 0.1 to 10 $m^2$ per gram of the at least one porous negative electrode excluding the current collector.

10. The battery according to claim 1, wherein a surface area of pores having a diameter of 0.01 to 0.2 μm, which is measured by the mercury porosimetery, is 5 to 50 $m^2$ per gram of the at least one porous negative electrode excluding the current collector.

11. The battery according to claim 1, wherein the active material is lithium-titanium oxide.

12. The battery according to claim 11, wherein the lithium-titanium oxide has a spinel structure.

13. The battery according to claim 1, wherein the nonaqueous electrolyte comprises a solvent which comprises at least two solvents selected from the group consisting of propylene carbonate, ethylene carbonate and γ-butyrolactone.

14. The battery according to claim 1, wherein the nonaqueous electrolyte comprises γ-butyrolactone.

15. The battery according to claim 1, wherein the positive electrode comprises a lithium-transition metal oxide having a layered crystal structure.

16. A battery pack comprising the nonaqueous electrolyte battery according to claim 1.

17. The battery pack according to claim 16, wherein a volume of pores having a diameter of 0.003 to 0.02 μm, which is measured by the mercury porosimetery, is 0.0005 to 0.01 mL per gram of the at least one porous negative electrode excluding the current collector.

18. The battery pack according to claim 16, wherein a surface area of pores having a diameter of 0.003 to 0.02 μm, which is measured by the mercury porosimetery, is 0.1 to 10 $m^2$ per gram of the at least one porous negative electrode excluding the current collector.

19. The battery pack according to claim 16, further comprising a protective circuit which detects a voltage of the nonaqueous electrolyte battery.

20. A vehicle comprising the battery pack according to claim 16.

21. The battery according to claim 1, wherein said active material is present in an amount of 70 wt % to 96 wt % relative to the total mass of said at least one porous negative electrode.

22. The battery according to claim 1, wherein a surface area of pores having a diameter of 0.003 to 0.02 μm, which is measured by the mercury porosimetery, is 0.2 to 2 $m^2$ per gram of the at least one porous negative electrode excluding the current collector.

23. The battery according to claim 1, wherein a surface area of pores having a diameter of 0.01 to 0.2 μm, which is measured by the mercury porosimetery, is 7 to 30 $m^2$ per gram of the at least one porous negative electrode excluding the current collector.

24. The battery according to claim 1, wherein a surface area of pores having a diameter of 0.003 to 0.02 μm, which is measured by the mercury porosimetery, is 0.1 to 1.22 $m^2$ per gram of the at least one porous negative electrode excluding the current collector.

25. The battery according to claim 1, wherein a surface area of pores having a diameter of 0.01 to 0.2 μm, which is measured by the mercury porosimetery, is 6.04 to 25.46 $m^2$ per gram of the at least one porous negative electrode excluding the current collector.

* * * * *